(12) United States Patent
Komatsu et al.

(10) Patent No.: US 9,188,782 B2
(45) Date of Patent: *Nov. 17, 2015

(54) VIRTUAL IMAGE DISPLAY DEVICE

(71) Applicant: SEIKO EPSON CORPORATION, Tokyo (JP)

(72) Inventors: Akira Komatsu, Tatsuno-Machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 14/172,518

(22) Filed: Feb. 4, 2014

(65) Prior Publication Data

US 2014/0225813 A1 Aug. 14, 2014

(30) Foreign Application Priority Data

Feb. 13, 2013 (JP) ................................. 2013-025272

(51) Int. Cl.
*G09G 5/00* (2006.01)
*G02B 27/01* (2006.01)
*G02B 17/08* (2006.01)

(52) U.S. Cl.
CPC .......... *G02B 27/0172* (2013.01); *G02B 17/086* (2013.01); *G02B 2027/0145* (2013.01)

(58) Field of Classification Search
CPC ............. G02B 27/0172; G02B 27/017; G02B 2027/0118; G02B 27/0101; G09G 3/025; G09G 3/002; G09B 9/307; H04N 5/7491

USPC ............................................................. 345/8
See application file for complete search history.

(56) References Cited

U.S. PATENT DOCUMENTS 5,453,877 A 9/1995 Gerbe et al.
6,747,612 B1 * 6/2004 Knox ................................ 345/8
(Continued)

FOREIGN PATENT DOCUMENTS

JP B-2746697 5/1998
JP B-3787399 6/2006
(Continued)

OTHER PUBLICATIONS

U.S. Appl. No. 14/172,293, filed Feb. 4, 2014.
(Continued)

*Primary Examiner* — Abbas Abdulselam
*Assistant Examiner* — Gerald Oliver
(74) *Attorney, Agent, or Firm* — Oliff PLC

(57) ABSTRACT

An intermediate image is formed inside the prism by a projection lens or the like, and since an image light that is totally reflected at three or more surfaces; at a third surface firstly, at a first surface firstly, at a third surface secondly, at the first surface secondly, and at the second surface in the order specified, transmits the first surface, and then arrives at an observer's eye, the size and weight of the prism can be reduced and it is possible to realize a display of high performance and brightness with a wide angle of view. In addition, since the external light can be observed after passing through the first surface and the third surface, and the visibility at that time becomes substantially zero, it is possible to reduce the defocus or distortion of the external light when observing the see-through external light.

17 Claims, 24 Drawing Sheets

(56) References Cited

U.S. PATENT DOCUMENTS

| | | | |
|---|---|---|---|
| 6,803,884 B1 * | 10/2004 | Ohzawa et al. | 345/1.1 |
| 7,719,769 B2 * | 5/2010 | Sugihara et al. | 359/630 |
| 2004/0141160 A1 * | 7/2004 | Yoneyama | 353/98 |
| 2006/0114417 A1 * | 6/2006 | Lee et al. | 353/33 |
| 2007/0064310 A1 | 3/2007 | Mukawa et al. | |
| 2007/0206289 A1 | 9/2007 | Inoguchi et al. | |

FOREIGN PATENT DOCUMENTS

| | | |
|---|---|---|
| JP | B-4218553 | 2/2009 |
| JP | B-4819532 | 11/2011 |

OTHER PUBLICATIONS

Office Action issued in U.S. Appl. No. 14/172,293 dated Oct. 9, 2014.

\* cited by examiner

VIRTUAL IMAGE DISPLAY DEVICE

BACKGROUND

1. Technical Field

The present invention relates to a virtual image display device that provides an image formed by an image display element or the like to an observer, particularly to a virtual image display device that is suitable for a head-mounted display mounted on the observer's head.

2. Related Art

A variety of optical systems are proposed, which are incorporated into a virtual image display device such as a head mount display (hereafter, referred to as HMD) that is mounted on an observer's head (refer to Japanese Patent No. 2746697, Japanese Patent No. 3787399, Japanese Patent No. 4218553, and Japanese Patent No. 4819532).

Regarding the virtual image display device such as the HMD, it is desirable to widen an angle of view and to reduce a weight of the device. Particularly, in order to improve a wear, it is important to make the device thin in thickness in a viewing axis direction of the observer and to make the center of gravity of the device closer to the observer.

In addition, if a view of the observer is entirely covered such that the observer can see only the image light, the observer cannot see the outside state and may have a feeling of anxiety. Furthermore, a variety of new applications of the virtual reality can be generated by making it possible to see the outside and the image in overlapping. For this reason, a display that displays the image light in overlapping without interfering with the view of the outside is desired.

Furthermore, in order to improve the wear on the observer and to make an external appearance of the device better, it is generally desirable to take on the form of glasses, and to place the image display device beside the face, not over the eyes.

In order to separate the image display device from the position of the eyes of the observer so that the size of the optical system becomes small and the view is not interfered, it is preferable to use a relay optical system in which an intermediate image is formed after forming an image of the display image light in the optical system once, and in which the enlarged intermediate image is displayed.

For example, in Japanese Patent No. 2746697, as a relay optical system, an optical system is proposed, in which an intermediate image is formed inside of a light guide plate using the light guide plate of plane-parallel shape in which the end surface has a parabolic mirror and a projection lens. However, in a case of the optical system in Japanese Patent No. 2746697, since the projection lens is large, it is difficult to reduce the size and weight.

In Japanese Patent No. 3787399, as a relay optical system, an optical system that includes a light guide prism having an emission reflection surface of curved surface and a projection lens, is proposed. However, in the optical system in Japanese Patent No. 3787399, there is no consideration for the outside viewing by the observer. In order for the observer to see the outside using this optical system, it is needed to paste a compensation prism on the reflective surface spread over the entire prism and to provide a half mirror on the bonded surface. Then, the image light is reflected twice on the half mirror surface, and thus the image becomes very dark.

In Japanese Patent No. 4218553, as a relay optical system, an optical system that includes a projection lens, a concave mirror, and a light guide plate is proposed. In the optical system, the reflection efficiency is increased by combining a wavelength plate and a polarization half mirror. However, in order for the observer to view the outside using the optical system in Japanese Patent No. 4218553, it is needed to paste a compensation lens together with the concave mirror, and accordingly, the system becomes thick as a whole.

In Japanese Patent No. 4819532, as a relay optical system, an optical system in which the overall length is shortened to be compact by bending the light path is proposed. However, in a case of the optical system in Japanese Patent No. 4819532, a convex portion of the prism center and a projection lens interfere with the view. In addition, the image light is folded back after transmitting through the half mirror, and is reflected at the half mirror, and is incident on the eyes. Therefore, the observed image becomes dark.

Moreover, in a method of forming a virtual image using a light guide prism, for example, bending of the light path on a plurality of different curved surfaces by forming a light guide prism by connecting a plurality of prism portions or forming a light guide prism by dividing a light guide prism into a plurality of prism portions, can be considered. In this case, the degree of freedom is increased in each curved surface, and an improvement in image forming performance is expected. However, depending on the optical design, a use environment, and the like, there is a concern that the external light is reflected in an unintended direction, and a ghost light can be generated in the cuts and the joints between the curved surfaces.

SUMMARY

An advantage of some aspects of the invention is to provide a virtual image display device that has a see through function with which an external light and an image light are displayed in overlapping, and has a wide angle of view and a high performance in function, and is minimized in size and weight.

An aspect of the invention is directed to a virtual image display device for recognizing an image light and an external light at the same time, the device includes: an image element that generates an image light; and a prism that includes three or more non-axisymmetric curved surfaces, and in which an intermediate image is formed as a part of an optical system. When the external light passes through a first surface and a third surface among a plurality of surfaces that configure the prism to recognize the outside, the visibility is substantially zero. The first surface and the third surface form a concave surface shape with respect to an observer side. The image light from the image element is totally reflected at the first surface, totally reflected at the third surface, totally reflected again at the first surface and reflected at the second surface, and then transmits through the first surface, and arrives at the observer side. Here, the image light is a light that is formed by an image element or the like and can be recognized by eyes as a virtual image, and is formed as an intermediate image inside the prism described above.

In the virtual display device described above, an intermediate image is formed inside the prism by the optical system. Furthermore, since the image light is reflected on surfaces in order of the first surface, the third surface, the first surface, and the second surface, and then it transmits through the first surface and then arrives at the observer, the prism can be made thin and the size and weight of the entire optical system can be reduced, and thus, it is possible to realize a display with high quality and brightness with a wide angle of view. In addition, the external light can be observed after passing through the first surface and the third surface, and the visibility at that time becomes substantially zero. Therefore, it is possible to reduce the defocus or distortion of the external light when observing the external light in see-through. In addition, the shape of the prism is made along the face of the observer, the center of gravity can be close to the face, and the design can also be excellent. In addition, since the prism is configured where the total reflection is performed multiple times on the first surface, the generation of discontinuous part in the surface involved in the light guiding among the surfaces of the prism can be reduced. As a result, the occurrence of such a situation that the ghost caused by the unintended reflection or the like at the discontinuous part of the prism can be avoided.

In a specific aspect of the invention, in the virtual display device described above, regarding the origin of each surface which configures the optical system as a reference, when an expression of a surface shape is polynomial expanded with respect to an orthogonal coordinates x and y which is extended in a tangential direction from the origin, then the condition in the below-described expressions 1 to 3 are satisfied, with coefficients of the terms $x^m \cdot y^n$ of the polynomial which indicates the kth surface as $Ak_{m,n}$.

$$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 5 \times 10^{-2} \quad (2)$$

$$|A1_{2,0} - A3_{2,0}| < 2 \times 10^{-2} \text{ and}$$

$$|A1_{0,2} - A3_{0,2}| < 2 \times 10^{-2} \quad (3)$$

Here, in the above description, the local coordinate (x, y, z) that includes the orthogonal coordinate x and y of each surface has an origin on one point on the curved surface, and has a z axis in a tangential direction, an x axis and a y axis in a normal direction. The origin of the curved surface, for example, is the position where the center of the light beam passes, and all of the origins are located on the same surface (reference surface).

In the specific aspect of the invention, it is possible to observe both of the image light and the external light that make both of the first surface and third surface to be a concave surface shape toward the observer. Additionally, by forming a free-curved surface with the first surface and the third surface, and effectively using the degree of freedom of the curved surface shape, it is successful to obtain an optical system with a high image quality. A function of the first surface and the third surface, that is, a factor that characterizes the function of the curved surface is a curvature of the curved surface. Since the curvature near the origin is mainly determined by values of coefficients $Ak_{2,0}$, and $Ak_{0,2}$ (k=1, 3), it is important to set the values of the coefficient $Ak_{2,0}$, and $Ak_{0,2}$ appropriately.

The condition (1) defines the magnitudes of the curvature of the first surface and the curvature of the third surface near the origin. If the values $A1_{2,0}$, $A1_{0,2}$, $A3_{2,0}$, and $A3_{0,2}$ are negative values, they represent the fact that the first surface or the third surface has a concave surface shape with respect to the observer. When the calculated values exceed the upper limit of the condition (1), the shape becomes close to a plane, even though the problem of the external light to the observer does not exist, the aberration correction of the image light does not effectively function. In addition, when the calculated values exceed the lower limit of the condition (1), the curvature becomes too large, it becomes difficult to correct the aberration, and the position of the prism approaches near the face and the wear is impaired.

The condition (2) defines a difference between the curvature of the third surface in the x axis direction and the curvature in the y axis direction. When the calculated values exceed the upper limit of the condition (2), the astigmatism generated in the third surface becomes too large, and it becomes difficult to correct the aberration.

The condition (3) defines a difference between the curvature of the first surface and the curvature of the third surface with respect to the x axis direction and the y axis direction, and affects an influence to the visibility of the prism with respect to the external light. When the thickness of the prism is T and the refractive index is N, the visibility Dx in the x axis direction on the optical axis of the prism and the visibility Dy in the y axis direction are influenced according to:

$$Dx = 2000(N-1)(A1_{2,0} - A3_{2,0} + (2T(N-1)/N) \times A1_{2,0} \times A3_{2,0})$$

$$Dy = 2000(N-1)(A1_{0,2} - A3_{0,2} + (2T(N-1)/N) \times A1_{0,2} \times A3_{0,2})$$

In general, if a tolerance of distant visibility exceeds ±1D, the observer feels uncomfortable, and accordingly, it is preferable to keep the visibility of the prism as ±1D. However, as the design, there is also a case where the visibility on the optical axis is set as be in the range of ±2D due to the balance between the visibility of the outer periphery portion and the aberration. As expressed in the expression, since the visibility on the optical axis is related to the thickness of the prism and the refractive index, the visibility is not determined by only the values of the aspherical coefficients. However, if the coefficients are in the range of satisfying the condition (3), it is possible to keep the visibility on the optical axis in the range of ±2D.

By making the shapes of the first surface and the third surface satisfy the above-described conditions (1) to (3), the aberration correction for both of the external light and the image light can be performed appropriately, and it is possible to acquire an excellent image quality.

In another specific aspect of the invention, a half mirror is formed on the second surface and the image light may be presented to the observer, a light transmitting member is integrally disposed outside the second surface, and the visibility with respect to the external light is substantially zero, and the external light and the image light are overlapped when presented to the observer. In this case, it is possible to reduce the defocus or distortion of the external light when observing the external light over the second surface.

In another specific aspect of the invention, the light transmitting member includes a first transmitting surface and a second transmitting surface in the observer side, and a third transmitting surface in the external side, the second surface of the prism and the second transmitting surface of the light transmitting member have substantially the same curved surface shapes, and the second surface and the second transmitting surface are integrated. In this case, two surfaces can be integrated by bonding, and thus, it is possible to form continuous surfaces on the first surface side and the third surface side respectively.

In another specific aspect of the invention, the virtual image display device further includes a projection lens that causes the image light from the image element to be incident on the prism, and at least a part of the prism and the projection lens configures a relay optical system. In this case, the relay optical system configured by the projection lens or the like forms an intermediate image in the prism.

In another specific aspect of the invention, the projection lens is formed of an axisymmetric lens and includes at least one or more aspherical surfaces.

In a, the prism includes a fourth surface that guides the image light incident on the inside of the prism from the projection lens, to the first surface.

In another specific aspect of the invention, the prism includes a fifth surface that is disposed to face the projection lens, causes the image light emitted from the projection lens to be incident, and guides the image light to the fourth surface.

In another specific aspect of the invention, the prism includes a first prism portion of the light emitting side including the first surface, the second surface, and the third surface, and a second prism portion of the light incident side, and the first prism portion and the second prism portion are integrated. In this case, the intermediate image can be formed in the prism in which the first prism portion and the second prism portion are integrally formed, at this time, by performing the total reflection at the first surface and the third surface of the first prism portion multiple times, it is possible to reduce the occurrence of discontinuity of the surface related to the light guide of the image light.

In another specific aspect of the invention, the second prism portion includes at least one or more optical surface and the intermediate image is formed by the image element, the projection lens, and at least a part of the prism where the second prism portion is included. In this case, at least the optical surface of the second prism portion contributes to forming of the intermediate image as a part of the relay optical system.

In another specific aspect of the invention, the image element is an image display element that emits an image light from the display position, and the projection lens and at least a part of the prism where the second prism portion is included causes the image light emitted from the display position of the image display element to form an image in the prism to form the intermediate image, as the relay optical system. In this case, by the projection lens or the like functioning as the relay optical system, the image light emitted from each point on the display position of the image display element is re-imaged in the prism and the intermediate image can be formed.

In another specific aspect of the invention, the second prism portion is disposed on the light incident side of the third surface of the first prism portion, and has a fourth surface that guides the image light incident on the inside from the projection lens to the first surface, in the first surface, the first prism portion includes a first region where the image light passed through the fourth surface of the second prism portion is totally reflected in a first time, and a second region where the image light is totally reflected in a second time, and the intermediate image is formed by the projection lens and a part where the first region of the second prism portion and the first prism portion is included. In this case, in addition to the projection lens and the second prism portion, a part of the first prism portion contributes to forming of the intermediate image as a part of the relay optical system.

In another specific aspect of the invention, the first prism portion and the second prism portion cause the intermediate image to be formed in front or back of the first region of the first surface, or between the front and back of the first region. In this case, it is possible to reduce the size of the entire device.

In another specific aspect of the invention, the second prism portion includes a fifth surface that is disposed to face the projection lens and causes the image light emitted from the projection lens to be incident on and guides to the fourth surface, and a sixth surface that is formed by being interposed between the fourth surface and the fifth surface. In this case, the size of the prism can be reduced and the size of the entire device can be reduced as well. In addition, the strength of the end surface can be increased and the scratch and the like can be suppressed.

In another specific aspect of the invention, the gap between the first surface and the third surface is equal to or more than 5 mm and is equal to or less than 15 mm. In this case, by making the gap equal to or more than 5 mm, it is possible to sufficiently increase the size of the first prism to cover in front of the eyes. By making the gap equal to or less than 15 mm, it is possible to suppress the increase of the weight.

In another specific aspect of the invention, an inclination angle of the second surface with respect to the first surface is equal to or more than 20° and may be equal to or less than 40°. In this case, by making the inclination angle be in the above-described range, it becomes easy to guide the image light to the eyes in the appropriate number of reflections and reflection angles.

In another specific aspect of the invention, when the device is mounted on, the optical system that includes the prism may cover a part of the front of the observer's eyes, and a part where the front of the eyes is not covered exists.

In another specific aspect of the invention, the image element includes a signal light forming section that emits a signal light which is modulated based on the image, and a scanning optical system that emits the signal light as a scanning light by scanning the signal light incident on from the signal light forming section.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a virtual display device in an embodiment of the invention will be described in detail with reference to the drawings.

A. An External Appearance of a Virtual Image Display Device

Figure 1:
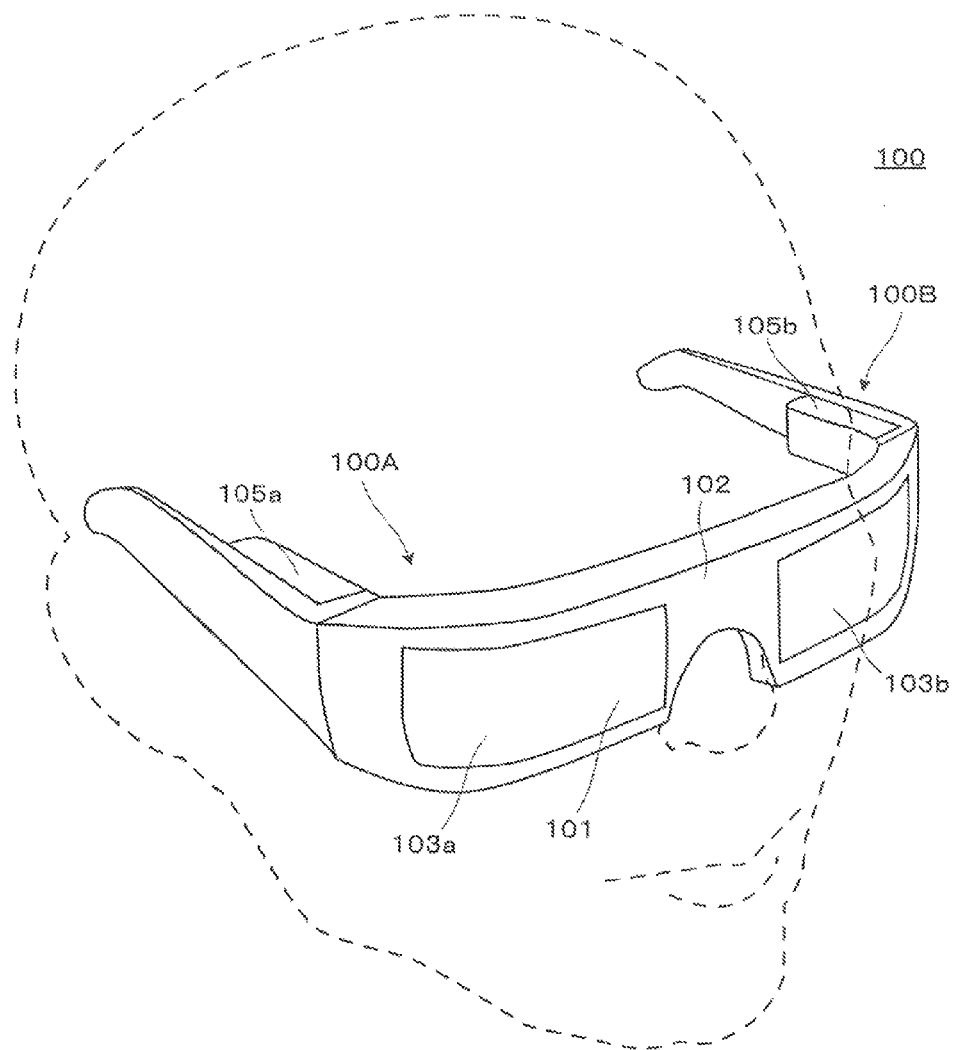
FIG. 1 is a perspective view illustrating an external appearance of a virtual image display device in the embodiment.

A virtual image display device 100 illustrated in FIG. 1 is a head mount display having an external appearance that is similar to glasses. The virtual image display device 100 can cause an observer who wears the virtual image display device 100 to recognize an image light which corresponds to the virtual image, and can cause the observer to recognize or observe the outside image in a see-through. The virtual image display 100 device includes a fluoroscopic member 101 that covers the front of the observer's eyes, a frame 102 that supports the fluoroscopic member 101, and a first and second built-in device sections 105a and 105b that are added to a portion from a cover section on both of the right and left ends of the frame 102 to a vine portion (temple) on the rearward. Here, the fluoroscopic member 101 is an optical member (a transparent eye cover) curved with thickness that covers the front of the observer's eyes, and is divided into two portions: a first optical portion 103a and a second optical portion 103b. A first display device 100A in which the first optical portion 103a and the first built-in device section 105a illustrated in the left side of the drawing are combined is a portion to form a virtual image for the right eye, and also functions as a virtual image display unit alone. In addition, a second display device 100B in which the second optical portion 103b and the second built-in device section 105b illustrated in the right side of the drawing are combined is a portion to form a virtual image for the left eye, and also functions as a virtual image display unit alone.

B. A Structure of the Display Device

Figure 2:
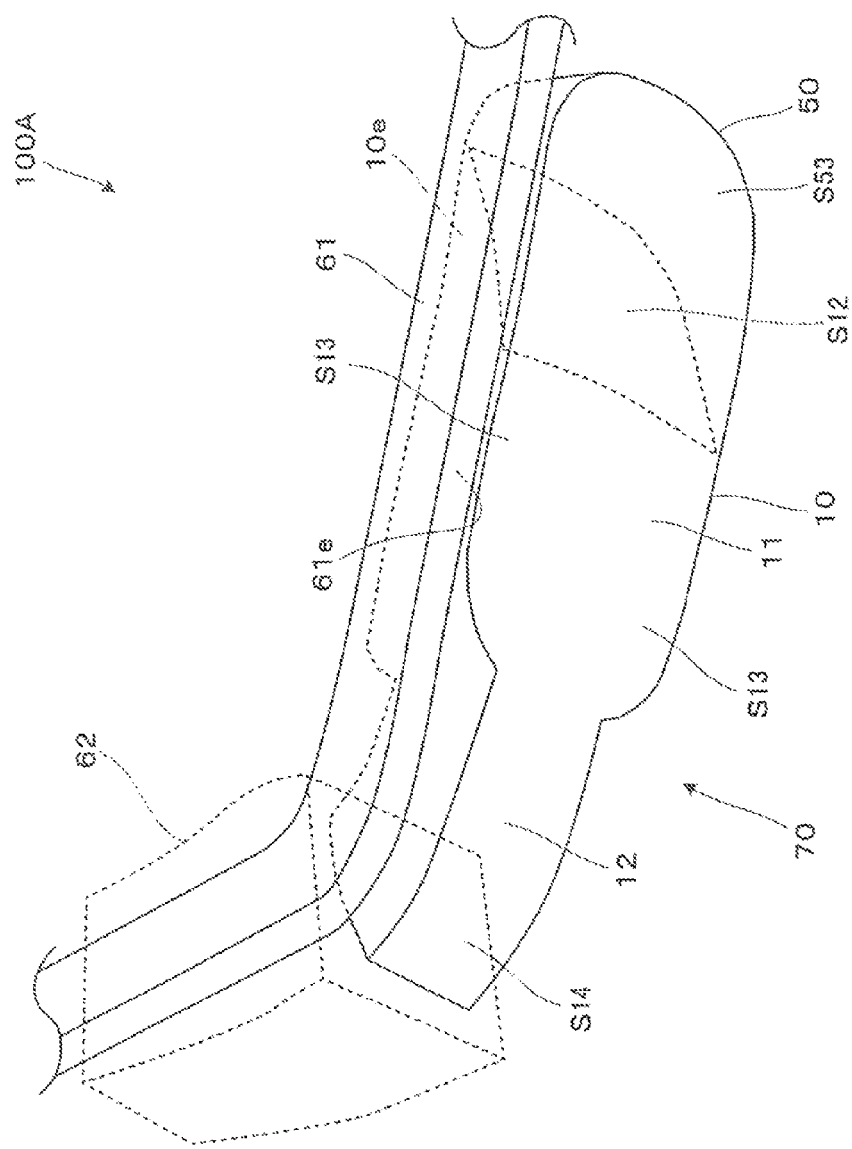
FIG. 2 is a perspective view illustrating a structure of a main body of the virtual image display device.
Figure 3A:
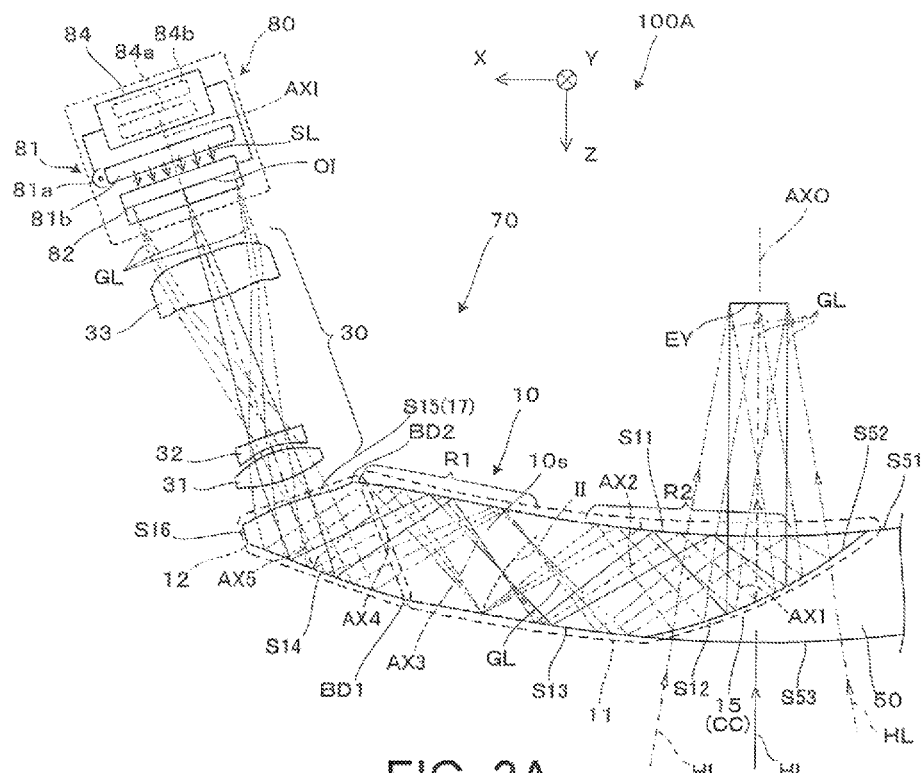
FIG. 3A is a cross-sectional view of the plan view of the main body portion of a first display device that forms the virtual image display device.
Figure 3B:
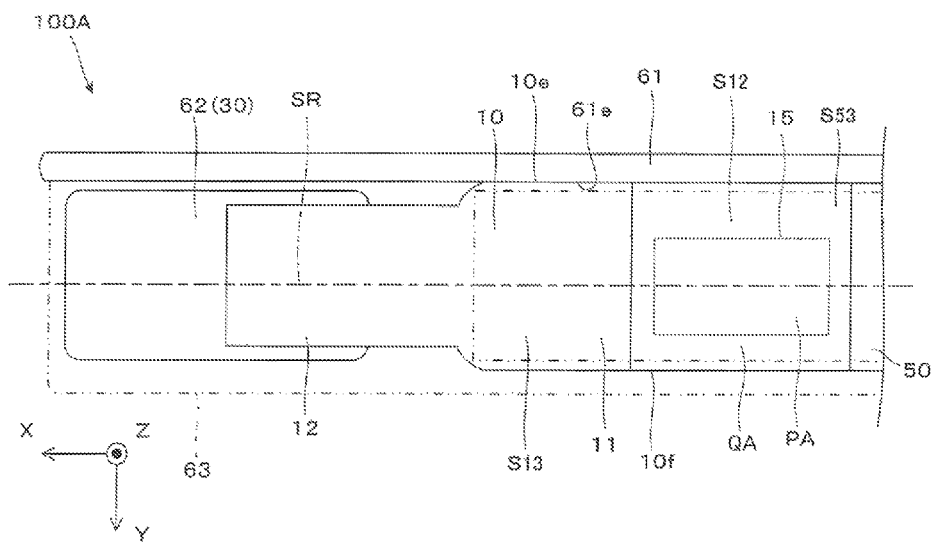
FIG. 3B is a front view of the main body portion.

As illustrated in FIG. 2, FIG. 3A, FIG. 3B, and the like, the first display device 100A includes a projection fluoroscope 70 and an image display device 80. Among them, the projection fluoroscope 70 includes a prism 10 that is a light guide member, a light transmitting member 50, and a projection lens 30 for image forming. The prism 10 and the light transmitting member 50 are integrated by bonding, and are firmly fixed on the lower side of the frame 61 such that the upper surface 10e of the prism 10 and the lower surface 61e of the frame 61 are in contact with each other. The projection lens 30 is fixed to the end portion of the prism 10 via a lens barrel 62 in which the projection lens 30 is accommodated. The prism 10 and the light transmitting member 50 of the projection fluoroscope 70 correspond to the first optical portion 103a in FIG. 1 and the projection lens 30 and the image display device 80 of the projection fluoroscope 70 correspond to the first built-in device section 105a in FIG. 1. Moreover, since the second display device 100B in FIG. 1 has the same structure as the first display device 100A, and only the right and left direction is inverted, the detail description of the second display device 100B will not repeated.

The prism 10 of the projection fluoroscope 70 is an arc-shaped and curved member so as to be along the face in a plan view, and can be considered by dividing the prism 10 into two portions: a first prism portion 11 on the center side near the nose and a second prism portion 12 on the peripheral side separated from the nose. The first prism portion 11 includes a first surface S11, a second surface S12, a third surface S13 as side surfaces disposed on the light emitting side and having an optical function, and the second prism portion 12 includes a fourth surface S14 and a fifth surface S15 as side surfaces disposed on the light-incident side and having an optical function. Among these, the second surface S12 is disposed between the first surface S11 and the third surface S13. The fourth surface S14 is disposed facing a part of the light-incident side among the first surface S11. In addition, the prism 10 includes a first side surface 10e and a second side surface 10f that are adjacent to the first to fifth surfaces S11 to S15 and are facing each other. Here, in the illustrated case, the light-incident side of the third surface S13 and the light emitting side of the fourth surface S14 intersect and form a connected boundary portion BD1 to be in a bent state in the boundary portion BD1. Moreover, in a case where the end of the third surface S13 and the end of the fourth surface S14 do not intersect to be in discontinued state, an additional surface is needed for connecting the third surface S13 and the fourth surface S14. However, the unsmooth portion such as the boundary portion BD1 or the additional surface exists only at one position in the prism 10, and by controlling the inclination angle in the vicinity of the boundary portion BD1 or making the additional surface to be sufficiently small, it is possible to prevent the boundary portion BD1 or the additional surface from being a major cause of ghosting. The fifth surface S15 is disposed between the first surface 511 and the fourth surface S14 so as to face the projection lens 30. The fifth surface S15 is connected to the fourth surface S14 in a separated state via the sixth surface S16 which does not have an optical function, and intersect the first surface S11 to form a boundary portion BD2, and directly connected in a bent state in the boundary portion BD2.

In the prism 10, the first surface S11 is a free-curved surface with an emission side light axis AXO which is parallel to the Z axis as a center axis or a reference axis, and the second surface S12 is a free-curved surface with a light axis AX1 which is included in the reference surface SR parallel to the XZ plane and inclined with respect to the Z axis as a center axis or a reference axis, the third surface S13 is a free-curved surface with an emission side light axis AXO as a center axis or a reference axis. The fourth surface S14 is a free-curved surface with a bisector of a pair of light axis AX4 and AX5 which is included in the reference surface SR parallel to the XZ plane and inclined with respect to the Z axis as a center axis or a reference axis, and the fifth axis S15 is a free-curved surface with an incident-side light axis AXI which is a light axis included in the reference surface SR parallel to the XZ plane and inclined with respect to the Z axis as a center axis or a reference axis. Moreover, the above-described first to fifth surfaces S11 to S15 extend horizontally (laterally) and across the reference surfaces SR through which the light axis AX1 to AX5 pass in parallel to the XZ plane, and have a symmetrical shape with respect to the longitudinal Y axis direction (vertical).

The prism 10 is formed of a resin material which shows a high optical transparency in the visible range, and, for example, is molded by injecting and setting the thermoplastic resin into a mold. The main body portion 10s of the prism 10 has an integrated formation. However, it is possible to consider dividing it into a first prism portion 11 and a second prism portion 12. The first prism portion 11 enables an image light GL to be guided and emitted and enables an external light HL to fluoroscope. The second prism portion 12 enables the image light GL to be incident and guided.

In the first prism portion 11, the first surface S11 functions as a refraction surface which causes the image light GL to be emitted outside the first prism portion 11 and functions as a total reflection surface which causes the image light GL to be totally reflected on the inner surface side of the image light GL. The first surface S11 is disposed in front of the eyes EY and forms a concave shape with respect to the observer. Moreover, in the first surface S11, the main body portion 10s may be coated with a hard coating layer in order to prevent the damage to the surface and the deterioration of the video resolution. The hard coating layer is formed by depositing a coating agent made from the resin or the like through dip treatment or spray coating on the lower surface of the main body portion 10s. Moreover, the total reflection of the image light GL in the first surface S11 can be considered by dividing it into two regions: a first region R1 that causes the image light GL which passes through the fourth surface S14 to be totally reflected (first total reflection) and a second region R2 that causes the image light GL which passes through the third surface S13 to be totally reflected (second total reflection).

The second surface S12 has a half mirror layer 15. The half mirror layer 15 is a reflection film (that is, a transflective film) having a light transparency. The half mirror layer (the transflective film) 15 is formed on the partial area PA, not on all the area of the second surface S12. That is, the half mirror layer 15 is formed on the partial area PA where the all of the area QA on which the second surface S12 extends is narrowed mainly with respect to a vertical direction. In more detail, the partial area PA is disposed on the center side with respect to the vertical Y axis direction, and substantially throughout the direction along the horizontal reference surface SR. The half mirror layer 15 is formed by film-forming of a metal reflective film or a dielectric multilayer film on a partial area PA of the lower surface of the main body portion 10s. The reflectance of the half mirror layer 15 with respect to the image light GL is to be equal to or higher than 10% and equal to or lower than 50% in the assumed range of incident angle under the view point of making the observing of the image light HL by see-through easy. The reflectance of image light GL of the half mirror layer 15 in the specific application example is, for example, set as 20%, and hence, the transmittance with respect to the image light GL is set as 80%.

The third surface S13 functions as a total reflection surface that causes the image light GL to be totally reflected in the inner surface side. Moreover, the main body portion 10s of the third surface S13 may also be covered by the hard coating layer in order to prevent the damage on the surface and the decrease of the resolution. The third surface S13 is disposed in front of the eyes EY, and is formed as a concave shape with respect to the observer similar to the first surface S11. Therefore, when the third surface S13 causes the external light HL to pass through the first surface S11 and the third surface S13 and sees the external light HL, the visibility is substantially zero.

The fourth surface S14 functions as a total reflection surface that causes the image light GL to be totally reflected in the inner surface side, or functions as a refraction surface when coated on the mirror layer 17. Moreover, in a case where the fourth surface S14 functions as a total reflection surface, the main body portion 10s may be coated with the hard coating layer in order to prevent the surface damage and to prevent the resolution of the image from being decreased.

The fifth surface S15 functions as a refraction surface that causes the image light GL to be incident on the inside of the second prism portion 12. Moreover, in the fifth surface S15, the main body portion 10s may be coated with the hard coating layer in order to prevent the surface damage and to prevent the resolution of the image from being decreased. However, instead of the hard coating layer, or in addition to the hard coat layer, an antireflection film 17 may be coated.

The sixth surface S16 is a surface connecting the fourth surface S14 and the fifth surface S15, in other words, the sixth surface S16 is a surface formed by being interposed between the fourth surface S14 and the fifth surface S15. However, as described above, the sixth surface S16 does not have an optical function. For this reason, compared to other surfaces S11 to S15, the surface precision of the sixth surface S16 may be rough, for example, may be appropriately rough so as to prevent the irregular reflection. In addition, in the illustrated case, the fourth surface S14 and the fifth surface S15 are connected without smoothness due to the sixth surface S16. However, the sixth surface S16 portion may have a variety of shapes as long as the optical influence is not affected. Furthermore, for example, since the boundary portion is formed by extending and directly connecting the fourth surface S14 and the fifth surface S15, the sixth surface S16 may be eliminated.

The light transmitting member 50 is integrally fixed to the prism 10. The light transmitting member 50 is a member (auxiliary prism) that assists the fluoroscopic function of the prism 10, and has a first transmitting surface S51, second transmitting surface S52, and third transmitting surface S53 as side surfaces having optical functions. Here, the second transmitting surface S52 is disposed between the first transmitting surface S51 and the third transmitting surface S53. The first transmitting surface S51 is on the curved surface that is an extension of the first surface S11 of the prism 10, the second transmitting surface S52 is a curved surface that is adhered and integrated with respect to the second surface S12 by the adhesion layer CC, and the third transmitting surface S53 is on the curved surface that is an extension of the third surface S13 of the prism 10. Among them, the second transmitting surface S52 and the second surface S12 of the prism 10 are integrated by the adhesion, thus, have a shape of substantially same curvature.

The light transmitting member (auxiliary prism) 50 is formed of a resin material showing a high optical transmittance in the visible range and having a substantially same refractive index as the main portion 10s of the prism 10. The light transmitting member 50 is, for example, form by molding of the thermoplastic resin. The projection lens 30 is held in the lens barrel 62, and the image display device 80 is fixed to one end of the lens barrel 62. The second prism portion 12 of the prism 10 is connected to the lens barrel 62 which holds the projection lens 30 and indirectly supports the projection lens 30 and the image display device 80. The light incident side of the prism 10 is covered with the shielding member 63 together with the projection lens 30. The upper end part or the lower end part of the prism 10 is also covered with the shielding member 63. In the vicinity of the prism 10, an additional shielding section may be provided in order to prevent the external light from being incident on the prism 10. The shielding section can be, for example, formed of a coating of light-shielding or a light scattering layer.

The projection lens 30, for example, has three lenses 31, 32, and 33 along the incident-side light axis AXI. Each lens 31, 32 and 33 is an axially symmetric lens, and has at least one or more aspheric surfaces. The projection lens 30 causes the image light GL emitted from the image display device 80 to be incident on the prism 10 via the fifth surface S15 of the prism 10 in order to re-image. That is, the projection lens 30 is a relay optical system in order for the image light or video light emitted from each point on the image plane (display position) OI of the image display element 82 to be re-imaged in the prism 10. Moreover, a part of surface of the light-incident surface side among each of the surfaces of the prism 10 functions as a part of the relay optical system by cooperation with the projection lens 30.

The image display device 80 includes an illumination device 81 that emits a two dimensional illumination light SL, a image display element 82 that is a transmission type spatial light modulation device, and a drive control section 84 that controls the operations of the illumination device 81 and the image display element 82.

The illumination device 81 of the image display device 80 includes a light source 81a that generates a light which includes three colors of red, green, and blue, and a back-light light guide portion 81b that diffuses the light emitted from the light source 81a and makes a light beam having a rectangular cross section. The image display element 82 is, for example, an image element formed on the liquid crystal display device, and spatially modulates the illumination light SL emitted from the illumination device 81 and forms the image light which is to be displayed such as moving images. The drive control section 84 includes a light source drive circuit 84a and a liquid crystal drive circuit 84b. The light source drive circuit 84a supplies power to the light source 81a of the illumination device 81 and causes the stable illumination light SL to be emitted. The liquid crystal drive circuit 84b forms a color image light which is a base of a moving image or a still image as a transmittance pattern by outputting an image signal or a drive signal with respect to the image display element (image element) 82. Moreover, it is possible to give an image processing function to the liquid crystal drive circuit 84b, and it is also possible to give the image processing function to an external control circuit.

C. Light Path of the Image Light

Hereafter, the light path of the image light GL in the virtual image display device 100 will be described.

The image light GL emitted from the image display element (image element) 82 is converged by the projection lens 30, and is incident on the fifth surface S15 that is provided on the second prism portion 12 of the prism 10 and has a comparatively strong positive refractive power.

The image light GL passing through the fifth surface S15 of the prism 10 continues to proceed when converged, and is totally reflected at the fourth surface S14 that has a comparatively weak positive refractive power when passing through the first prism portion 11, and then, is totally reflected at the first surface S11 (more specifically, the first region R1) that has a comparatively weak negative refractive power (the first total reflection at the first surface S11).

In the first prism portion 11, the image light GL reflected at the first surface S11 is incident on the third surface S13 and is totally reflected, and again incident on the first surface S11 (more specifically, the second region R2) and is totally reflected (the second total reflection at the first surface S11). Moreover, the image light GL forms an intermediate image in the prism 10 in the curved state before passing through the third surface S13. The image plane II of the intermediate image corresponds to the image plane (display position) OI of the image display element 82.

The image light GL which is totally reflected at the first surface S11 second time is incident on the second surface S12, but the image light GL particularly incident on the half mirror layer 15 partially transmits the half mirror layer 15 and partially reflected and again incident on the first surface S11 and passes through. Moreover, the half mirror layer 15 acts as a surface having a comparatively strong positive refractive power with respect to the image light GL reflected here. In addition, the first surface S11 acts as a surface having a negative refractive power with respect to the image light GL passing through.

The image light GL passing through the first surface S11 is incident on the pupil of the observer's eye EY as a substantially parallel light beam. That is, the observer observes the image formed on the image display element 82 by the image light GL as a virtual image.

In contrast, among the external light HL, the light incident on the +X side compared to the second surface S12 of the prism 10 passes through the third surface S13 and the first surface S11 of the first prism portion 11, and at this time, the positive and negative refraction power are cancelled out and the aberration is corrected. That is, the observer observes the outside image with less distortion over the prism 10. Similarly, among the external light HL, when the light incident on the −X side compared to the second surface S12 of the prism 10, that is, incident on the light transmitting member 50 passes through the third transmitting surface S53 and the first transmitting surface S51 provided here, the positive and negative refraction power are cancelled out and the aberration is corrected. That is, the observer observes the outside image with less distortion over the prism 10 and the light transmitting member 50. Furthermore, among the external light HL, when the light incident on the light transmitting member 50 which corresponds to the second surface S12 of the prism 10 passes through the third transmitting surface S53 and the first transmitting surface S51, the positive and negative refraction power are cancelled out and the aberration is corrected. That is, the observer observes the outside image with less distortion over the light transmitting member 50. Moreover, the second surface S12 of the prism 10 and the second transmitting surface S52 of the light transmitting member 50 has the substantially same curved surface shape respectively and the substantially same refractive index, and a gap therebetween is filled with an adhesive layer CC of the substantially same refractive index. That is, the second surface S12 of the prism 10 and the second transmitting surface S52 of the light transmitting member 50 do not act as a refractive surface with respective the external light HL.

However, since the external light HL incident on the half mirror layer 15 is partly transmitted and partly reflected at the half mirror layer 15, the external light HL from the direction corresponding to the half mirror 15 becomes weak based on the transmittance of the half mirror layer 15. In contrast, from the direction corresponding to the half mirror layer 15, the image light GL is incident. Accordingly, the observer observes the outside image in the direction of half mirror layer 15 together with the image formed on the image display element 82.

Among the image light GL propagated in the prism 10 and incident on the second surface S12, the light which is not reflected at the half mirror layer 15 is incident on the light transmitting member 50, but is prevented from returning to the prism 10 due to a not illustrated anti-reflection section provided on the light transmitting member 50. That is, the image light GL passed through the second surface S12 is prevented from being returned to the light path and from becoming a strayed light. In addition, the external light HL incident from the light transmitting member 50 and reflected at the half mirror layer 15 is returned to the light transmitting member 50, but is prevented from being emitted to the prism 10 due to the above-described and not illustrated anti-reflection section provided on the light transmitting member 50. That is, the external light HL reflected at the half mirror layer 15 is prevented from being returned to the light path and from becoming a strayed light.

D. Method of Defining the Optical Surface and Light Path

Figure 4:
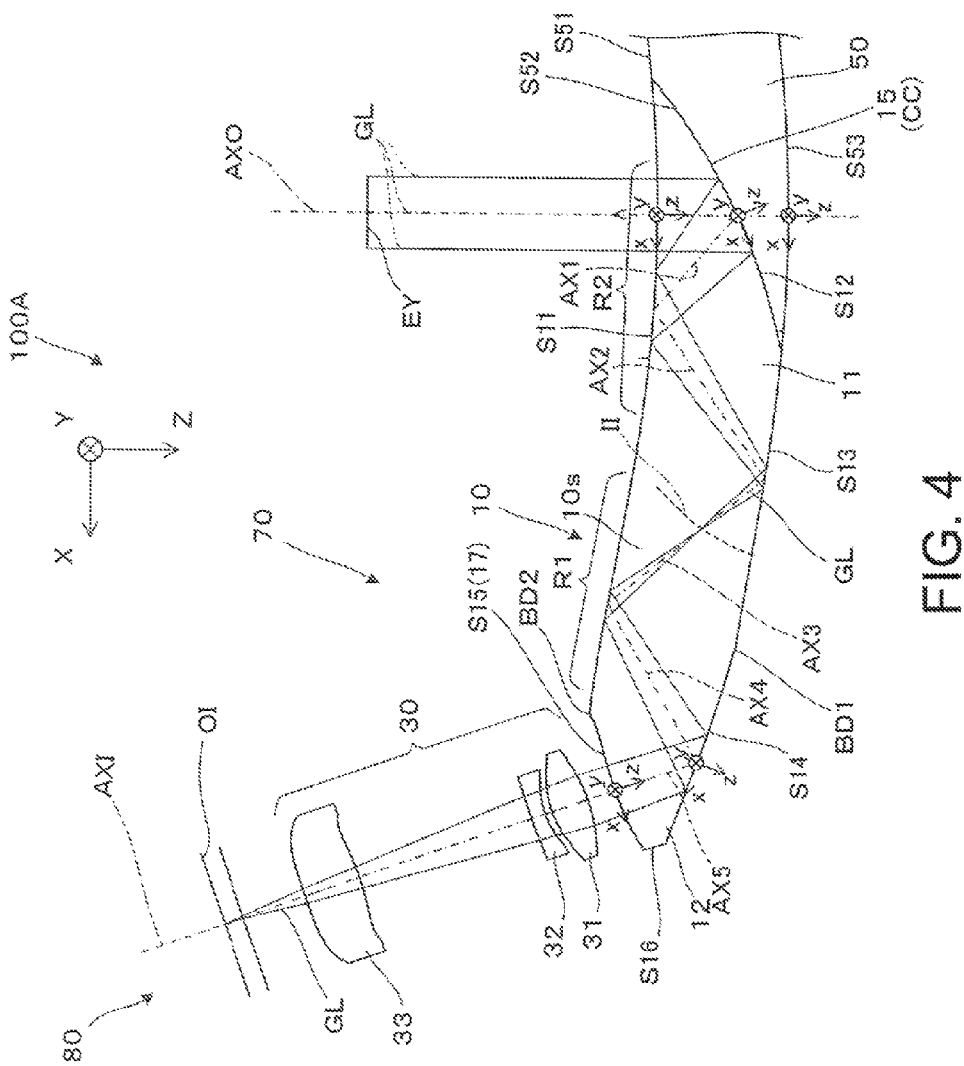
FIG. 4 is a cross-sectional view illustrating a light surface and a light path in a prism in the first display device.

FIG. 4 is a diagram illustrating light axis AX1 to AX5 and a local coordinate in the prism 10. In the description hereafter, considering the evaluation in the optical system or the convenience of the expression, the optical plane and the light path are defined in a reverse direction from the observer's eyes EY toward the image display element 82 of the image display device 80. In the optical system in actual, the light generated from the image display element 82 sequentially passes through the projection lens 30 and the prism 10, and arrives at the eyes EY. However, in that situation, it is difficult to evaluate the optical system. For this reason, since the optical system is evaluated and designed as the light from the light source at infinity, passes through a diaphragm at the position of the eyes EY and is input to the prism 10, and then passes through the projection lens 30 to form an image on the image display element 82, data of the optical system described in detail hereafter is also expressed in such an order. Moreover, regarding the light transmitting member 50 which is used as an integrated unit by being joined to the prism 10, the shape thereof is obtained by extending the shape of the prism 10, and thus, the description is omitted.

In the prism 10 illustrated, the light axis on the first surface S11 coincides with the emitting side light axis AXO, and the local coordinate (x, y, z) of the first surface S11 is in a translation relations with the global coordinate (X, Y, Z) and has an origin on the first surface S11. That is, z direction in the local coordinate is on the emitting side light axis AXO which is an advancing direction (reverse direction of the light), and y direction in the local coordinate is parallel to the Y direction in the global coordinate. In each surface hereafter, the y direction in the local coordinate is parallel to the Y direction in the global coordinate.

The light axis on the second surface S12 is appropriately inclined with respect to the emitting side light axis AXO, the local coordinate of the second surface S12 is appropriately rotated around the Y axis with respect to the global coordinate and keeps the translation relation, and has an origin on the second surface S12. The Z direction in the local coordinate on the second surface S12 is an intermediate direction between the emitting side light axis AXO and the light axis AX1 of the center of the light beam toward the first surface S11 from the second surface S12.

The light axis on the third surface S13 coincides with the emitting side light axis AXO, the local coordinate of the third surface S13 is in a translation relations with the global coordinate (X, Y, Z) and has an origin on the extended surface of the third surface S13, that is, on the third transmitting surface S53.

As described above, the intermediate direction between the light axis AX1 of the center of the light beam toward the first surface S11 from the second surface S12 and the light axis AX2 of the center of the light beam toward the third surface S13 from the first surface S11 coincides with a normal direction of the first surface S11 in the center of the light beam (an intersection of light axes AX1 and AX2) on the first surface S11. In addition, the intermediate direction between the light axis AX2 of the center of the light beam toward the third surface S13 from the first surface S11 and the light axis AX3 of the center of the light beam toward the first surface S11 from the third surface S13 coincides with a normal direction of the third surface S13 in the center of the light beam (an intersection of light axes AX2 and AX3) on the third surface S13.

In the light path toward the first surface S11 from the third surface S13 again, the local coordinate corresponds to the advancing direction (a reverse direction of the light). That is, the z direction in the local coordinate from the third surface S13 to the first surface S11 coincides with the light axis AX3 of the center of the light beam, and the y direction in the local coordinate is parallel to the Y direction in the global coordinate. Moreover, light axis AX4 of the center of the light beam is extended by folding the light axis AX3 of the center of the light beam at the first surface S11, and the light axis AX5 of the center of the light beam is extended by folding again the light axis AX4 of the center of the light beam at the third surface S13.

An origin of the local coordinate on the fourth surface S14 is on the fourth surface S14. In addition, the z direction in the local coordinate on the fourth surface S14, that is, the light axis on the fourth surface S14 is a bisector of the light axis AX4 of the center of the light beam from the first surface S11 to the fourth surface S14 and the light axis AX5 of the center of the light beam from the fourth surface S14 to the fifth surface S15.

The light axis on the fifth surface S15 coincides with the light axis AX5, and coincides with the incident-side light axis AXI which is extended from the image display device 80. The local coordinate of the fifth surface S15 is in the translation relation and has an origin on the fifth surface S15.

As described above, as a result of tracing in the reverse direction of the light, for the traveling direction of the light beam, by tracing the above-described each light axes AX1 to AX5 from the incident-side light axis AXI which is the center of the light beam of the image light emitted from the center of the image plane OI, and leading to the emitting side light axis AXO in the reverse order, the light arrives at the observer's eyes EY.

E. Preferable Characteristics of Optical Surface

The shape of the first surface S11 of the prism 10 is expressed as $$z = \Sigma\{A1_{m,n} \cdot (x^m \cdot y^n)\} \quad (4)$$

using the local coordinate (x, y, z) of the first surface S11. Here, $A1_{m,n}$ is a coefficient of the m·$n_{th}$ term of expanded polynomial. m and n are integers equal to or larger than zero.

The shape of the second surface S12 of the prism 10 is expressed as $$z = \Sigma\{A2_{m,n} \cdot (x^m \cdot y^n)\} \quad (5)$$

using the local coordinate (x, y, z) of the second surface S12. Here, $A2_{m,n}$ is expressed by a coefficient of the m·$n_{th}$ term of expanded polynomial.

The shape of the third surface S13 of the prism 10 is expressed as $$z = \Sigma\{A3_{m,n} \cdot (x^m \cdot y^n)\} \quad (6)$$

using the local coordinate (x, y, z) of the third surface S13. Here, $A3_{m,n}$ expressed by a coefficient of the m·$n_{th}$ term of expanded polynomial.

The first to third surfaces S11 to S13 of the prism 10 in the embodiment satisfies three conditions as follows.

$$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 5 \times 10^{-2} \quad (2)$$

$$|A1_{2,0} - A3_{2,0}| < 2 \times 10^{-2} \text{ and}$$

$$|A1_{0,2} - A3_{0,2}| < 2 \times 10^{-2} \quad (3)$$

By setting the shape of the first to third surfaces S11 to S13 so as to satisfy the above-described three conditions, the aberration of both of the external light HL and the image light GL is successfully performed, and it is possible to provide excellent image quality.

The gap between the first surfaces S11 and the third surface S13 of the prism 10 is equal to or larger than 5 mm and equal to or smaller than 15 mm. In addition, the inclination angle of the second surface S12 with respect to the first surface S11 is equal to or larger than 20° and equal to or smaller than 40°.

In the virtual image display device 100 according to the embodiment, an intermediate image is formed in the prism 10 by the projection lens 30 and the like, and the image light GL that is totally reflected at three or more surfaces; the first surface S11 firstly, the third surface S13, the first surface S11 secondly, and the second surface S12 in this order, and then transmits through the first surface S11 and then arrives at the observer's eye EY. Accordingly, the prism 10 can be made thin in the thickness and can be reduced in the size and weight of the entire optical system, and then it is possible to realize a display of high performance and brightness with a wide angle of view. In addition, the external light HL, for example, can be observed after passing through the first surface S11 and the third surface S13, and the visibility at that time becomes substantially zero. Therefore, it is possible to reduce the defocus or distortion of the external light HL when observing the external light HL in see-through. In addition, the shape the prism 10 is along the face of the observer, the center of gravity can be close to the face, and the design can also be made excellent. In addition, in the embodiment described above, since the prism 10 is configured that the total reflection is performed multiple times in the first surface S11, the generation of discontinuous part in the surface involved in the light guiding among the surfaces of the prism 10 is reduced. As a result, the occurrence of such a situation that the ghost caused by the unintended reflection or the like at the discontinuous part of the prism can be avoided. Moreover, in the embodiment, a bent part such as boundary portion BD1 between the third surface S13 and the fourth surface S14. However, there is only one such part in the prism 10, and it is possible to adjust such that the part is not a cause of occurrence of ghosting by appropriately adjusting based on necessity. In the embodiment, by making the third surface S13 and the fourth surface S14 to be separate free-curved surfaces, an adjustment with a high degree of freedom can be made. Therefore, it is possible to relatively easily improve the imaging performance.

APPLICATION EXAMPLES

Hereafter, an application example of a projection fluoroscope that is incorporated in a virtual image display device according to the invention will be described. The symbols used in each application example are summarized as follows.
SPH: pupil
FFSk: free-curved surface (k in the prism=surface number)
ASPk: Axisymmetric aspherical surface (k in the projection optical system=surface number)
SPH: spherical surface or plane (protective glass surface)
R: radius of curvature
T: axial surface distance
Nd: refractive index with respect to the line d of the optical material
Vd: Abbe number with respect to the line d of the optical material
TLY: inclination angle (°) of the optical axis in a cross-section surface (XZ section) in a specific surface (There is a case where the TLY varies at the front and back of the specific surface)
DCX: amount of shift of the optical axis in an X axis direction in a cross-section surface (XZ cross-section) in a specific surface.

Application Example 1

Data for optical surface that configures the prism and the projection lens of the projection fluoroscope in the application example 1 is shown in Table 1 below. Moreover, for example, FFS1 means the first surface S11, FFS2 means the second surface S12, and FFS3 means the third surface S13. In addition, ASP1 means the emitting surface of the first lens of the projection lenses, and ASP2 means the incident surface of the first lens.

TABLE 1

| No | Type | R | T | Nd | Vd |
|---|---|---|---|---|---|
| 1 | SPH | ∞ | 22.00 | | |
| 2 | FFS1 | −98.434 | 5.50 | 1.525 | 55.95 |
| 3 | FFS2 | −42.793 | −5.50 | 1.525 | 55.95 |
| 4 | FFS1 | −98.434 | 9.00 | 1.525 | 55.95 |
| 5 | FFS3 | −107.434 | −9.00 | 1.525 | 55.95 |
| 6 | FFS1 | −98.434 | 6.00 | 1.525 | 55.95 |
| 7 | FFS4 | −104.477 | −6.00 | 1.525 | 55.95 |
| 8 | FFS5 | 30.142 | −2.00 | | |
| 9 | ASP1 | −11.550 | −2.59 | 1.525 | 55.95 |
| 10 | ASP2 | 7.019 | −0.50 | | |
| 11 | ASP3 | 5.809 | −1.00 | 1.585 | 29.90 |
| 12 | ASP4 | 24.036 | −12.59 | | |
| 13 | ASP5 | −15.474 | −4.00 | 1.525 | 55.95 |
| 14 | ASP6 | 150.859 | −4.51 | | |
| 15 | SPH | ∞ | −1.60 | 1.458 | 67.82 |
| 16 | image surface | | | | |

Regarding the optical surface of the prism that configures the application example 1, the inclination angle (tilt) TLY of the optical axis in the cross-section surface thereof, and the amount of shift (de-centered) DCX of the optical axis is shown in Table 2 described below.

TABLE 2

| No | Type | TLY(front) | DCX(back) | TLY(back) |
|---|---|---|---|---|
| 2 | FFS1 | 0 | 0 | 0 |
| 3 | FFS2 | −24.5 | 0 | 24.5 |
| 4 | FFS1 | 0 | 0 | 0 |
| 5 | FFS3 | 0 | 0 | 0 |
| 6 | FFS1 | 0 | 32.88 | 60.5 |
| 7 | FFS4 | −40.0 | 0 | −40.0 |
| 8 | FFS5 | 0 | 0 | 0 |

Regarding each optical surface of the prism that configures the application example 1, the coefficient $Ak_{m,n}$ expressed by the expanded polynomial of the free-curved surface is shown in Table 3 below. Here, in Table 3, the symbols m and n mean the variables or the orders in the coefficient $Ak_{m,n}$. In addition, the symbol FFSk (k=1 to 5) means the $k_{th}$ surface among the first to fifth surfaces S11 to S15 which are the free-curved surfaces. Moreover, the coefficient $Ak_{m,n}$ means the coefficient of each term $x^m \cdot y^n$ which configures the polynomial that expresses the subjected $k_{th}$ surface.

TABLE 3

| m | n | FFS1 | FFS2 | FFS3 | FFS4 | FFS5 |
|---|---|---|---|---|---|---|
| 2 | 0 | −5.080E−03 | −1.168E−02 | −4.654E−03 | −4.786E−03 | 1.659E−02 |
| 0 | 2 | −1.008E−02 | −1.174E−02 | −9.651E−03 | −1.151E−02 | 3.156E−02 |

TABLE 3-continued

| m | n | FFS1 | FFS2 | FFS3 | FFS4 | FFS5 |
|---|---|------|------|------|------|------|
| 3 | 0 | −5.293E−06 | 2.375E−05 | −5.293E−06 | 2.565E−04 | 6.473E−04 |
| 1 | 2 | −2.594E−04 | −7.109E−05 | −2.594E−04 | −1.182E−03 | −5.831E−03 |
| 4 | 0 | 3.630E−07 | −2.269E−06 | 3.630E−07 | 4.329E−05 | 1.875E−04 |
| 2 | 2 | 2.517E−06 | −4.461E−06 | 2.517E−06 | −5.058E−06 | −6.792E−04 |
| 0 | 4 | −1.1885E−05 | −8.874E−07 | −1.188E−05 | 2.414E−05 | −2.801E−04 |
| 5 | 0 | 1.459E−08 | 4.220E−08 | 1.459E−08 | 4.706E−06 | 4.432E−05 |
| 3 | 2 | −8.582E−07 | 3.910E−08 | −8.582E−07 | −1.137E−05 | −6.305E−05 |
| 1 | 4 | 4.292E−06 | 1.276E−06 | 4.292E−06 | 1.013E−06 | −2.122E−05 |
| 6 | 0 | 3.386E−10 | −1.816E−08 | 3.386E−10 | 1.201E−07 | −8.627E−06 |
| 4 | 2 | 1.536E−08 | −1.241E−07 | 1.536E−08 | −1.988E−06 | −3.496E−05 |
| 2 | 4 | −2.114E−07 | −2.366E−07 | −2.114E−07 | −1.717E−06 | −2.473E−05 |
| 0 | 6 | −4.688E−07 | −1.656E−07 | −4.688E−07 | −1.361E−06 | −8.507E−06 |

In the above-described Table 3 and Tables described below, after E of the nemeric value means the exponent of the decimal numbers, for example, "−5.080E−03" means −5.080×10⁻⁰³.

The coefficient of the aspherical surface of the optical surface that configures the projection lens of the projection fluoroscope in the application example 1 is shown in Table 4 below.

TABLE 4

|  | ASP1 | ASP2 | ASP3 | ASP4 |
|--|------|------|------|------|
| K | 0 | 0 | 0 | 0 |
| B4 | −3.443E−04 | 5.227E−06 | −8.350E−04 | −9.652E−04 |
| B6 | 4.806E−06 | −2.924E−05 | −6.766E−05 | 3.562E−06 |
| B8 | 8.512E−07 | 6.652E−07 | −7.330E−07 | −5.339E−06 |

|  | ASP5 | ASP6 |
|--|------|------|
| K | 0 | 0 |
| B4 | 6.890E−04 | 8.285E−04 |
| B6 | 1.597E−05 | 1.905E−05 |
| B8 | 1.150E−06 | 7.055E−10 |

In table 4 described above, the symbols K and Bi indicate the coefficients for specifying an aspherical surface out of the asperical surfaces APS1 to APS6 which are the lens surfaces of three lenses 31 to 33 that configure the projection lens 30. The aspherical surface is specified by a polynomial (equation of aspherical surface) below.

$$z = \frac{(1/R) \times h^2}{1 + \sqrt{1 - (K+1) \times (1/R)^2 \times h^2}} + B_4 h^4 + B_6 h^6 + B_8 h^8 + \ldots$$

Here, R is a radius of the curvature of each surface, h is a height from the optical axis, K is a conical coefficient of the subjected lens surface, and Bi (I=4, 6, 8, . . . ) is a high order aspherical coefficient of the subjected lens surface.

Figure 5:
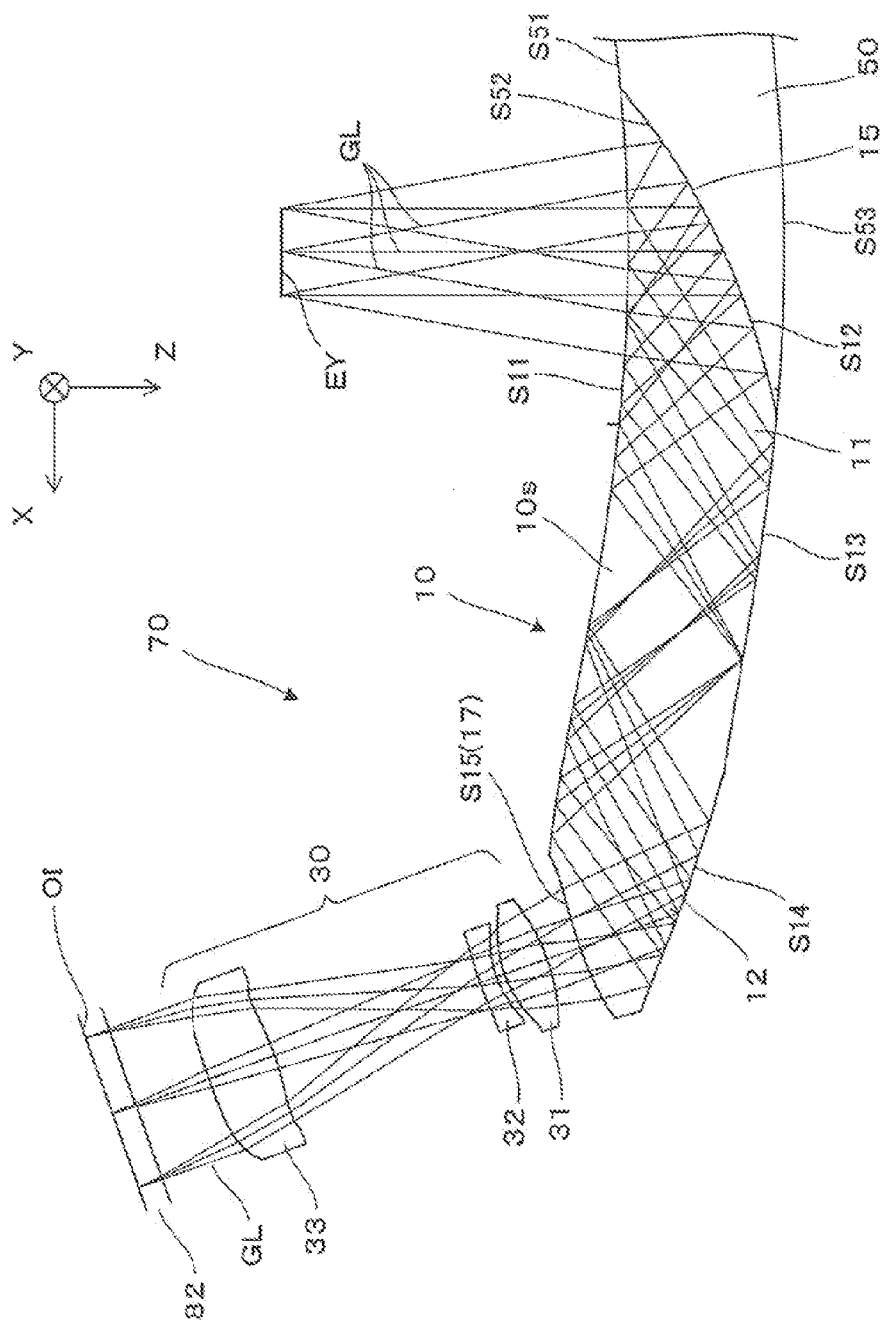
FIG. 5 is a diagram illustrating an optical system in Application Example 1.
Figure 6A:
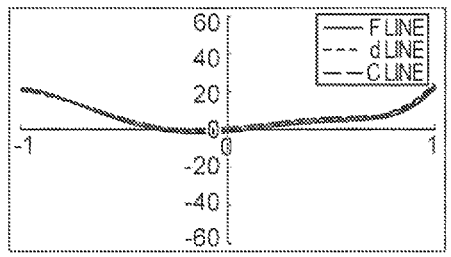
FIGS. 6A to 6F are diagrams illustrating aberrations of an optical system in Application Example 1.
Figure 6D:
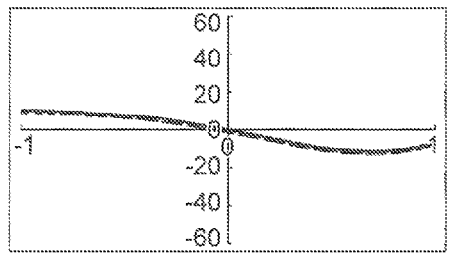
Figure 6B:
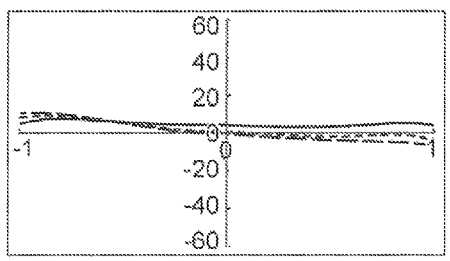
Figure 6E:
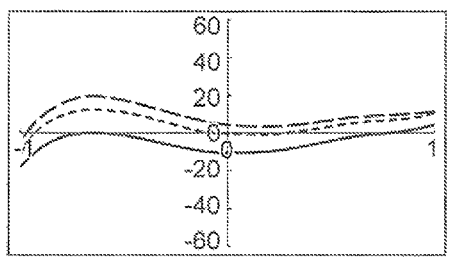
Figure 6C:
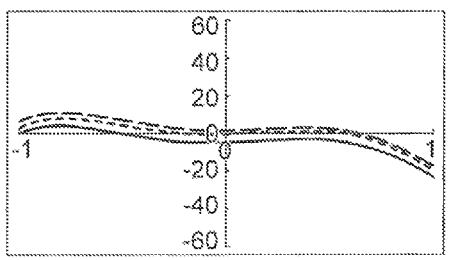
Figure 6F:
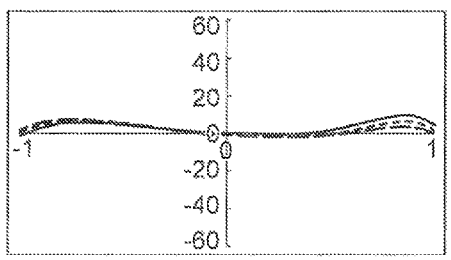

FIG. 5 is a cross-sectional diagram of the projection fluoroscope 70 in the application example 1. However, not only the light beam on the reference surface SR but also the light beam away from the reference surface SR in Y direction is illustrated. The prism 10 of the projection fluoroscope 70 includes the first surface S11 that has a relatively weak negative refractive power, the second surface S12 that has a relatively strong positive refractive power, the third surface S13 that has a relatively weak positive refractive power, the fourth surface S14 that has a relatively weak positive refractive power, and the fifth surface S15 that has a relatively strong positive refractive power. The projection lens 30 includes a first lens 31 that has a positive refractive power, a second lens 32 that has a negative refractive power, a third lens 33 that has a positive refractive power, and all of the surfaces thereof is aspherical surfaces. The detailed specification of the optical system in the application example 1 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 7A:
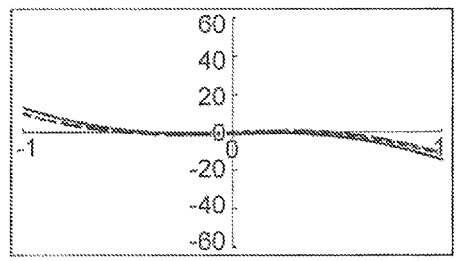
FIGS. 7A to 7F are diagrams illustrating aberrations of the optical system in Application Example 1.
Figure 7D:
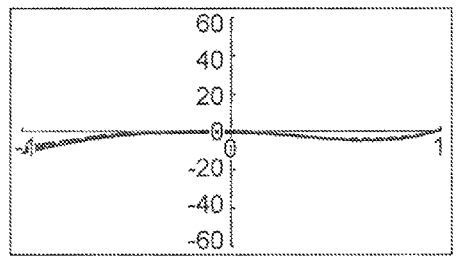
Figure 7B:
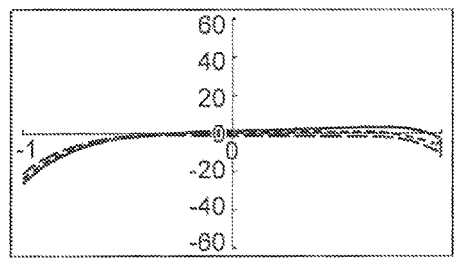
Figure 7E:
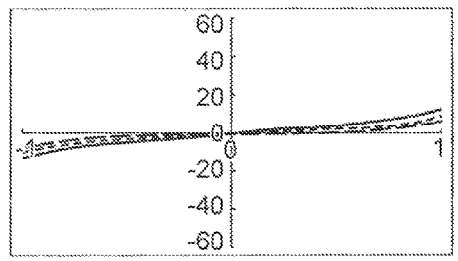
Figure 7C:
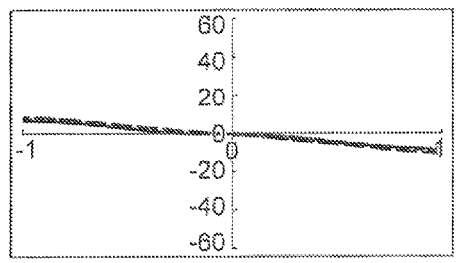
Figure 7F:
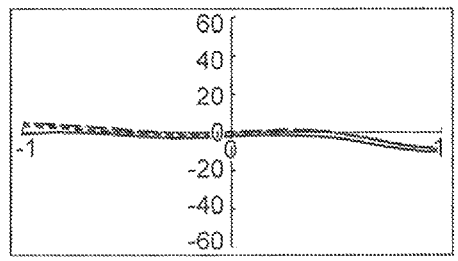

FIGS. 6A to 6F and FIGS. 7A to 7F illustrate the aberrations in the application example 1. In each aberration diagram, a horizontal axis represents the position in the pupil, and a vertical axis represents an amount of aberration in microns. Specifically, FIGS. 6A and 6B indicates the aberration in Y and X directions in the direction of 10° in the X direction and 5.7° in the Y direction, and FIGS. 6C and 6D indicate the aberration in Y and X directions in the direction of 0.0° in the X direction and 5.7° in the Y direction, and FIGS. 6E and 6F indicate the aberration in Y and X directions in the direction of −10° in the X direction and 5.70 in the Y direction. FIGS. 7A and 7B indicate the aberration in Y and X directions in the direction of 10° in the X direction and 0.0° in the Y direction, FIGS. 7C and 7D indicate the aberration in Y and X directions in the direction of 0.0° in the X direction and 0.0° in the Y direction, and FIGS. 7E and 7F indicate the aberration in Y and X directions in the direction of −10° in the X direction and 0.0° in the Y direction. Moreover, the illustrated amount of aberration is considered as the amount of aberration in the image plane of the image display element in a case where the light beam reversely travels for the sake of convenience in explanation.

Application Example 2

Data for optical surface that configures the prism and the projection lens of the projection fluoroscope in the application example 2 is shown in Table 5 below.

TABLE 5

| No | Type | R | T | Nd | Vd |
|----|------|---|---|----|----|
| 1 | SPH | ∞ | 22.00 | | |
| 2 | FFS1 | −40.889 | 5.00 | 1.525 | 55.95 |
| 3 | FFS2 | −31.073 | −5.00 | 1.525 | 55.95 |
| 4 | FFS1 | −40.889 | 9.00 | 1.525 | 55.95 |
| 5 | FFS3 | −42.593 | −9.00 | 1.525 | 55.95 |
| 6 | FFS1 | −40.889 | 6.00 | 1.525 | 55.95 |
| 7 | FFS4 | −122.593 | −6.00 | 1.525 | 55.95 |
| 8 | FFS5 | −26.417 | −2.00 | | |
| 9 | ASP1 | −5.981 | −4.50 | 1.525 | 55.95 |
| 10 | ASP2 | 7.011 | −0.80 | | |
| 11 | ASP3 | 5.091 | −1.00 | 1.585 | 29.90 |
| 12 | ASP4 | 36.142 | −13.32 | | |
| 13 | ASP5 | −9.304 | −4.00 | 1.525 | 55.95 |
| 14 | ASP6 | −23.176 | −13.89 | | |
| 15 | SPH | ∞ | −1.44 | 1.458 | 67.82 |
| 16 | image surface | | | | |

Regarding the optical surface of the prism that configures the application example 2, the inclination angle (tilt) TLY of the optical axis in the cross-section surface thereof, and the amount of shift (de-centered) DCX of the optical axis is shown in Table 6 described below.

TABLE 6

| No | Type | TLY (front) | DCX (back) | TLY (back) |
|---|---|---|---|---|
| 2 | FFS1 | 0 | 0 | 0 |
| 3 | FFS2 | −24.5 | 0 | 24.5 |
| 4 | FFS1 | 0 | 0 | 0 |
| 5 | FFS3 | 0 | 0 | 0 |
| 6 | FFS1 | 0 | 32.50 | 81.0 |
| 7 | FFS4 | −42.0 | 0 | −42.0 |
| 8 | FFS5 | 0 | 0 | 0 |

Regarding each optical surface of the prism that configures the application example 2, the coefficient expressed by the expanded polynomial of the free-curved surface is shown in Table 7 below. Here, in Table 7, the symbols m and n mean the variables or the orders in the coefficient $Ak_{m,n}$. In addition, the symbol FFSk (k=1 to 5) means the $k_{th}$ surface among the first to fifth surfaces S11 to S15 which are the free-curved surfaces.

TABLE 7

| m | n | FFS1 | FFS2 | FFS3 | FFS4 | FFS5 |
|---|---|---|---|---|---|---|
| 2 | 0 | −1.223E−02 | −1.609E−02 | −1.174E−02 | −4.079E−03 | −1.893E−02 |
| 0 | 2 | −1.580E−02 | −1.540E−02 | −1.494E−02 | −6.770E−03 | −1.293E−02 |
| 3 | 0 | 2.898E−05 | 7.594E−05 | 1.965E−05 | 1.165E−04 | 2.675E−05 |
| 1 | 2 | −2.121E−04 | −7.108E−05 | −1.439E−04 | 5.222E−05 | −3.084E−04 |
| 4 | 0 | 3.392E−06 | −1.034E−05 | 1.743E−06 | 1.563E−05 | 7.584E−04 |
| 2 | 2 | 1.698E−05 | −6.471E−06 | 8.724E−06 | 1.302E−05 | 1.294E−03 |
| 0 | 4 | 4.491E−06 | −6.671E−06 | 2.308E−06 | −1.965E−05 | 5.742E−04 |
| 5 | 0 | −5.885E−07 | 4.064E−07 | −2.291E−07 | 1.497E−06 | 2.194E−05 |
| 3 | 2 | −2.140E−06 | −3.746E−07 | −8.331E−07 | 1.446E−06 | 1.139E−05 |
| 1 | 4 | −2.523E−06 | −3.992E−07 | −9.823E−07 | −1.583E−06 | −9.350E−06 |
| 6 | 0 | 1.369E−08 | −2.083E−08 | 4.038E−09 | 1.182E−07 | −2.557E−06 |
| 4 | 2 | 6.501E−08 | 7.839E−08 | 1.917E−08 | 4.945E−08 | −1.242E−05 |
| 2 | 4 | 8.792E−08 | 1.356E−07 | 2.593E−08 | −3.495E−07 | −1.558E−05 |
| 0 | 6 | −3.192E−07 | 2.885E−08 | −9.413E−08 | 3.173E−07 | −3.556E−06 |

The coefficient of the aspherical surface of the optical surface that configures the projection lens of the projection fluoroscope in the application example 2 is shown in Table 8 below.

TABLE 8

| | ASP1 | ASP2 | ASP3 |
|---|---|---|---|
| K | 0 | 0 | 0 |
| B4 | 9.006E−05 | −1.468E−03 | −3.049E−03 |
| B6 | −4.997E−06 | 3.028E−05 | 6.791E−05 |
| B8 | 1.630E−07 | −3.201E−07 | −8.107E−07 |

| | ASP4 | ASP5 | ASP6 |
|---|---|---|---|
| K | 0 | 0 | 0 |
| B4 | −1.869E−03 | 5.505E−05 | −1.503E−04 |
| B6 | 4.634E−06 | −3.477E−06 | 1.335E−06 |
| B8 | 6.582E−07 | −3.635E−08 | −1.774E−07 |

In Table 8 described above, the symbols K and Bi indicate the coefficients for specifying an aspherical surface out of the asperical surfaces APS1 to APS6 hich are the lens surfaces of three lenses 31 to 33 that configure the projection lens 30.

Figure 8:
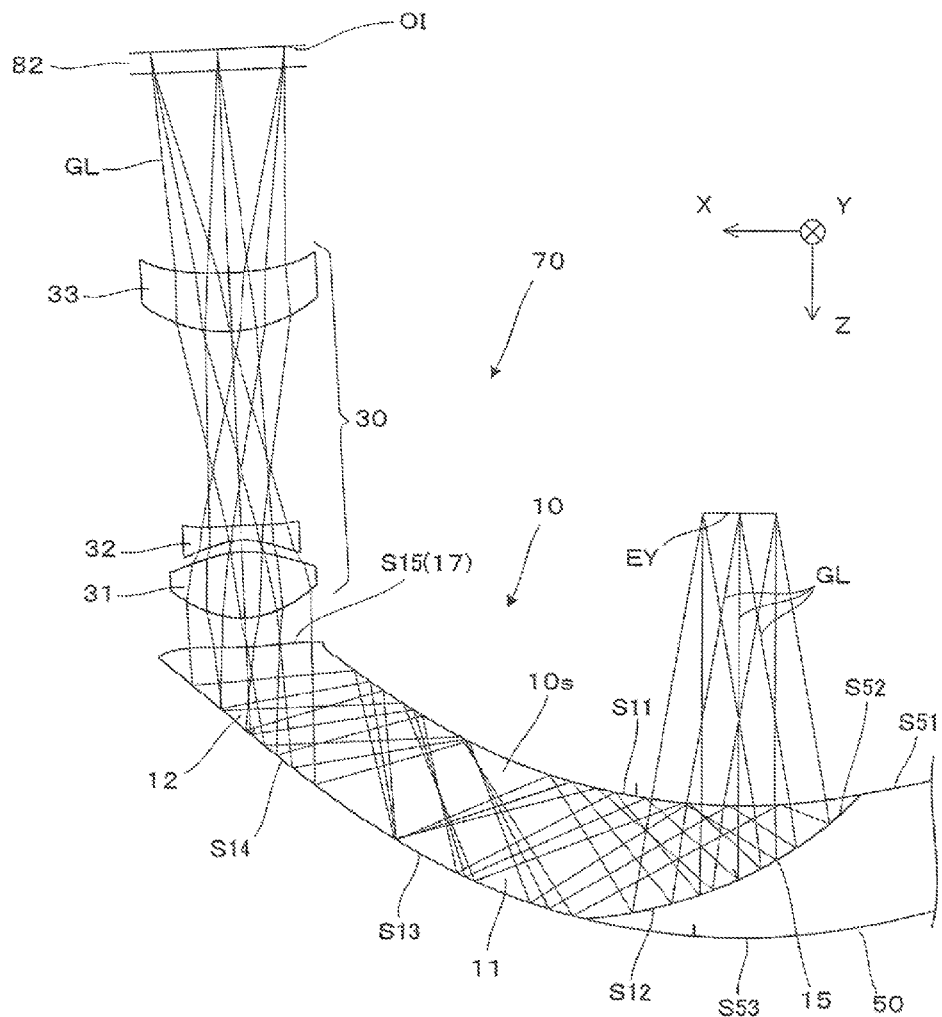
FIG. 8 is a diagram illustrating an optical system in Application Example 2.
Figure 9A:
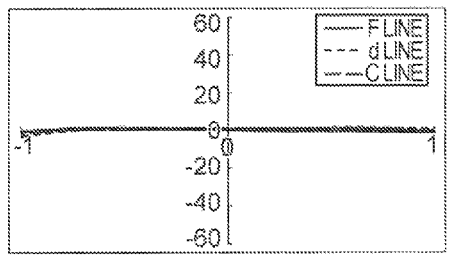
FIGS. 9A to 9F are diagrams illustrating aberrations of an optical system in Application Example 2.
Figure 9D:
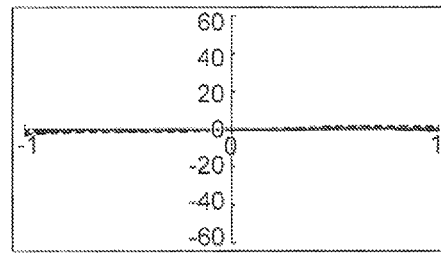
Figure 9B:
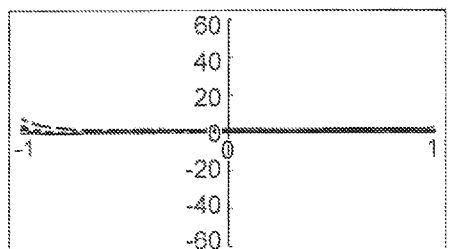
Figure 9E:
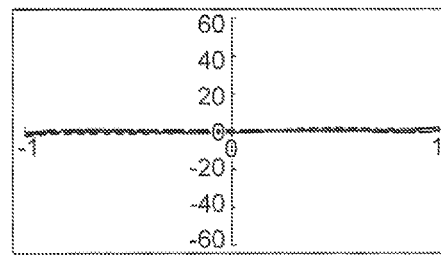
Figure 9C:
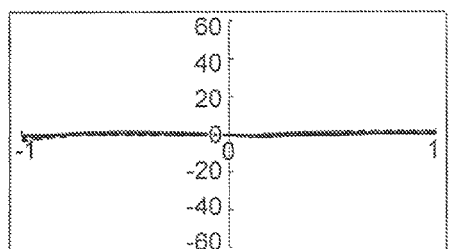
Figure 9F:
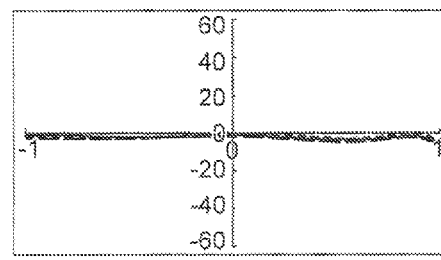

FIG. 8 is a cross-sectional diagram of the projection fluoroscope 70 in the application example 2. The prism 10 of the projection fluoroscope 70 includes the first surface S11 that has a relatively weak negative refractive power, the second surface S12 that has a relatively strong positive refractive power, the third surface S13 that has a relatively weak positive refractive power, the fourth surface S14 that has a relatively weak positive refractive power, and the fifth surface S15 that has a relatively strong negative refractive power. The protection lens 30 includes a first lens 31 that has a positive refractive power, a second lens 32 that has a negative refractive power, and a third lens 33 that has a negative refractive power. The detailed specification of the optical system in the application example 2 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 10A:
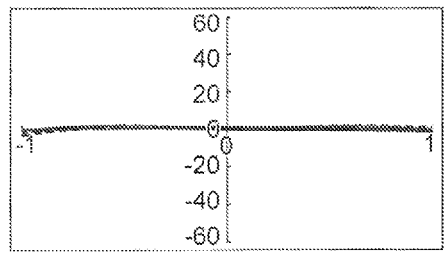
FIGS. 10A to 10F are diagrams illustrating aberrations of the optical system in Application Example 2.
Figure 10D:
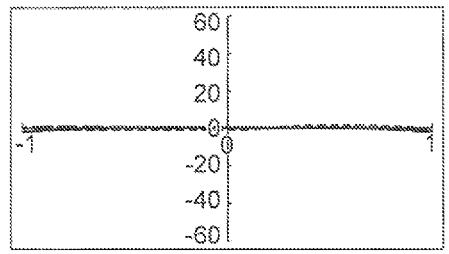
Figure 10B:
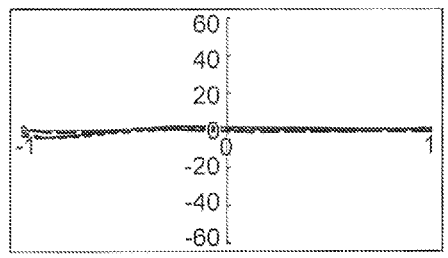
Figure 10E:
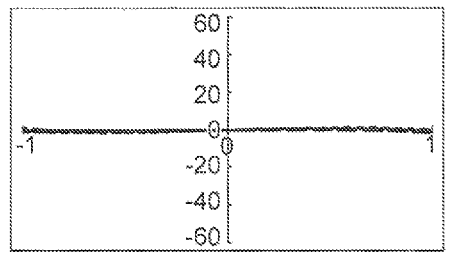
Figure 10C:
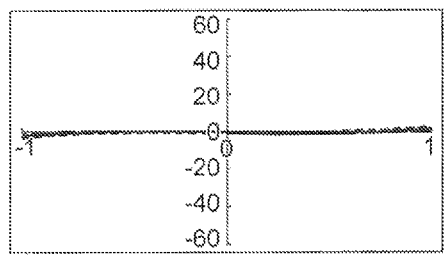
Figure 10F:
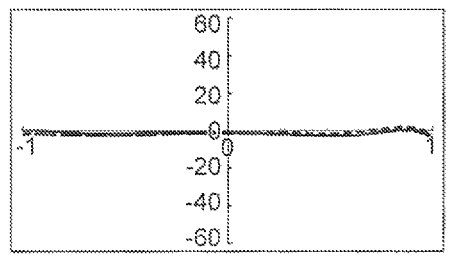

FIGS. 9A to 9F and FIGS. 10A to 10F illustrate the aberrations in the application example 2. Specifically, FIGS. 9A and 9B indicate the aberration in Y and X directions in the direction of 10° in the X direction and 5.7° in the Y direction, and FIGS. 9C and 9D indicate the aberration in Y and X directions in the direction of 0.0° in the X direction and 5.70 in the Y direction, and FIGS. 9E and 9F indicate the aberration in Y and X directions in the direction of −10° in the X direction and 5.7° in the Y direction. FIGS. 10A and 10B indicate the aberration in Y and X directions in the direction of 10° in the X direction and 0.0° in the Y direction, FIGS. 10C and 10D indicate the aberration in Y and X directions in the direction of 0.0° in the X direction and 0.0° in the Y direction, and FIGS. 10E and 10F indicate the aberration in Y and X directions in the direction of −10° in the X direction and 0.0° in the Y direction.

Application Example 3

Data for optical surface that configures the prism and the projection lens of the projection fluoroscope in the application example 3 is shown in Table 9 below.

TABLE 9

| No | Type | R | T | Nd | Vd |
|---|---|---|---|---|---|
| 1 | SPH | ∞ | 20.00 | | |
| 2 | FFS1 | −3684.299 | 5.50 | 1.525 | 55.95 |
| 3 | FFS2 | −60.588 | −5.50 | 1.525 | 55.95 |
| 4 | FFS1 | −3684.299 | 9.00 | 1.525 | 55.95 |
| 5 | FFS3 | −3837.811 | −9.00 | 1.525 | 55.95 |
| 6 | FFS1 | −3684.299 | 6.00 | 1.525 | 55.95 |
| 7 | FFS4 | −111.550 | −7.00 | 1.525 | 55.95 |
| 8 | FFS5 | 29.681 | −5.00 | | |
| 9 | ASP1 | −4.930 | −5.50 | 1.525 | 55.95 |
| 10 | ASP2 | 8.630 | −0.50 | | |
| 11 | ASP3 | 5.129 | −1.00 | 1.585 | 29.90 |
| 12 | ASP4 | −12.054 | −7.67 | | |
| 13 | ASP5 | −8.828 | −5.00 | 1.525 | 55.95 |
| 14 | ASP6 | 16.954 | −4.99 | | |
| 15 | SPH | ∞ | −1.44 | 1.458 | 67.82 |
| 16 | image surface | | | | |

Regarding the optical surface of the prism that configures the application example 3, the inclination angle (tilt) TLY of the optical axis in the cross-section surface thereof, and the amount of shift (de-centered) DCX of the optical axis is shown in Table 10 described below.

TABLE 10

| No | Type | TLY (front) | DCX (back) | TLY (back) |
|---|---|---|---|---|
| 2 | FFS1 | 0 | 0 | 0 |
| 3 | FFS2 | −26 | 0 | 26 |
| 4 | FFS1 | 0 | 0 | 0 |
| 5 | FFS3 | 0 | 0 | 0 |
| 6 | FFS1 | 0 | 42.00 | 82.1 |
| 7 | FFS4 | −47.0 | 0 | −47.0 |
| 8 | FFS5 | 0 | 0 | 0 |

Regarding each optical surface of the prism that configures the application example 3, the coefficient expressed by the expanded polynomial of the free-curved surface is shown in Table 11 below. Here, in Table 11, the symbols m and n mean the variables or the orders in the coefficient $Ak_{m,n}$. In addition, the symbol FFSk (k=1 to 5) means the $k_{th}$ surface among the first to fifth surfaces S11 to S15 which are the free-curved surfaces.

TABLE 11

| m | n | FFS1 | FFS2 | FFS3 | FFS4 | FFS5 |
|---|---|---|---|---|---|---|
| 2 | 0 | −1.357E−04 | −8.252E−03 | −1.303E−04 | −4.482E−03 | −1.685E−02 |
| 0 | 2 | −1.360E−02 | −1.210E−02 | −1.218E−02 | −4.125E−03 | 3.332E−02 |
| 3 | 0 | −3.981E−04 | −1.898E−04 | −2.700E−04 | −8.873E−06 | −4.641E−04 |
| 1 | 2 | −4.796E−04 | −9.733E−05 | −3.253E−04 | 9.499E−05 | 6.704E−05 |
| 4 | 0 | 1.109E−05 | 1.133E−05 | 5.697E−06 | −3.078E−06 | 1.409E−04 |
| 2 | 2 | 3.812E−05 | 9.549E−06 | 1.959E−05 | −1.213E−05 | 3.412E−04 |
| 0 | 4 | 8.358E−06 | −1.249E−06 | 4.295E−06 | −2.418E−05 | 1.609E−04 |
| 5 | 0 | −2.341E−07 | −1.050E−06 | −9.111E−08 | 3.937E−07 | 7.259E−06 |
| 3 | 2 | −1.243E−06 | −1.201E−06 | −4.838E−07 | 5.702E−07 | 3.582E−06 |
| 1 | 4 | −2.348E−06 | −7.264E−07 | −9.141E−07 | −1.660E−06 | −8.970E−06 |
| 6 | 0 | 2.585E−09 | 8.195E−08 | 7.623E−10 | 2.325E−08 | 2.105E−07 |
| 4 | 2 | 1.848E−08 | 1.005E−07 | 5.451E−09 | 1.607E−07 | −8.473E−07 |
| 2 | 4 | 3.976E−08 | 6.587E−08 | 1.172E−08 | 2.288E−07 | −2.161E−06 |
| 0 | 6 | 2.020E−07 | 1.803E−08 | 5.958E−08 | 1.507E−07 | −4.170E−07 |

The coefficient of the aspherical surface of the optical surface that configures the projection lens of the projection fluoroscope in the application example 3 is shown in Table 12 below.

TABLE 12

| | ASP1 | ASP2 | ASP3 |
|---|---|---|---|
| K | 0 | 0 | 0 |
| B4 | −5.710E−04 | −2.658E−03 | −1.008E−02 |
| B6 | −2.820E−06 | 5.774E−05 | 6.397E−04 |
| B8 | −2.345E−07 | 2.972E−07 | −1.774E−05 |

TABLE 12-continued

| | ASP4 | ASP5 | ASP6 |
|---|---|---|---|
| K | 0 | 0 | 0 |
| B4 | −9.016E−03 | −2.635E−05 | −1.471E−04 |
| B6 | −6.197E−05 | 1.193E−06 | 1.970E−06 |
| B8 | 5.231E−05 | −4.499E−08 | −6.498E−08 |

In Table 12 described above, the symbols K and Bi indicate the coefficients for specifying an aspherical surface out of the asperical surfaces APS1 to APS6 which are the lens surfaces of three lenses 31 to 33 that configure the projection lens 30.

Figure 11:
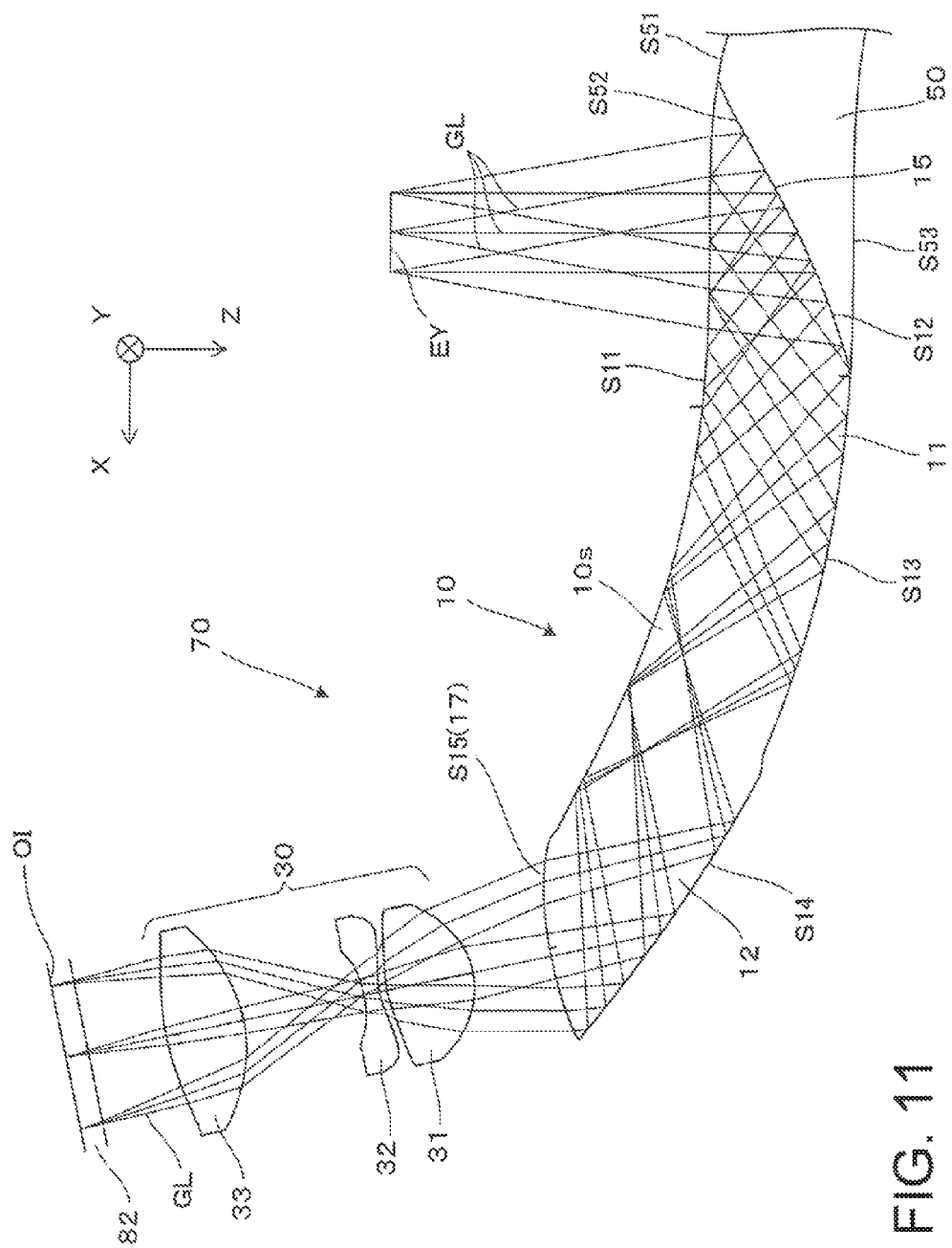
FIG. 11 is a diagram illustrating an optical system in Application Example 3.
Figure 12A:
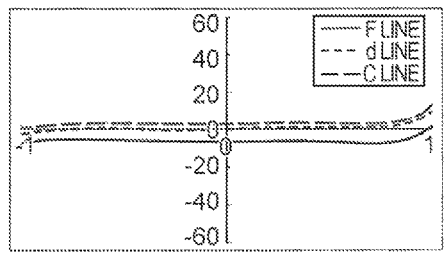
FIGS. 12A to 12F are diagrams illustrating aberrations of an optical system in Application Example 3.
Figure 12D:
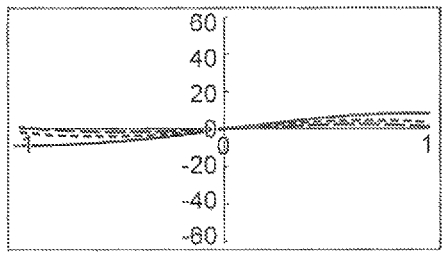
Figure 12B:
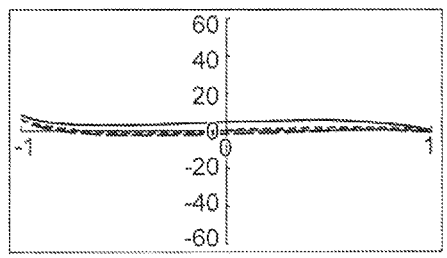
Figure 12E:
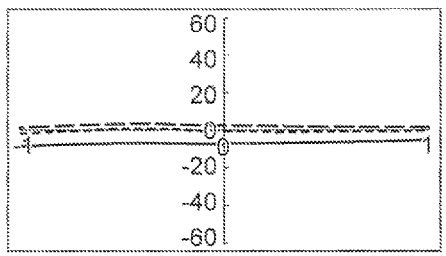
Figure 12C:
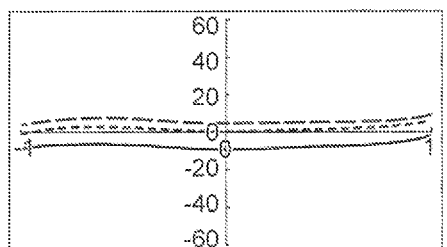
Figure 12F:
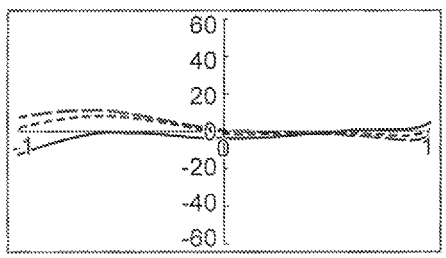

FIG. 11 is a cross-sectional diagram of the projection fluoroscope 70 in the application example 3. The prism 10 of the projection fluoroscope 70 includes the first surface S11 that has a relatively weak negative refractive power, the second surface S12 that has a relatively strong positive refractive power, the third surface S13 that has a relatively weak positive refractive power, the fourth surface S14 that has a relatively weak positive refractive power, and the fifth surface S15 that has a relatively strong positive refractive power. The projection lens 30 includes a first lens 31 that has a positive refractive power, a second lens 32 that has a negative refractive power, a third lens 33 that has a positive refractive power. The detailed specification of the optical system in the application example 3 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 13A:
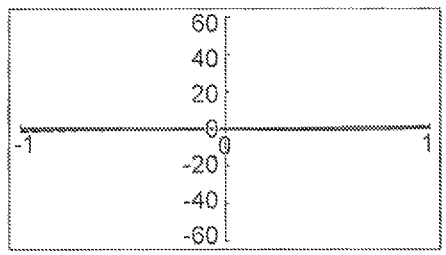
FIGS. 13A to 13F are diagrams illustrating aberrations of the optical system in Application Example 3.
Figure 13D:
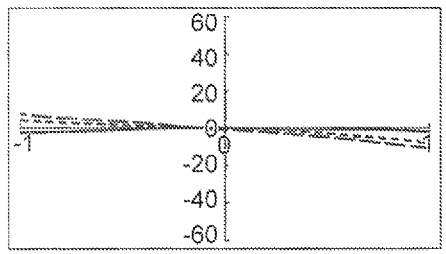
Figure 13B:
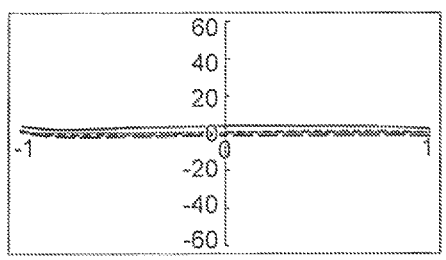
Figure 13E:
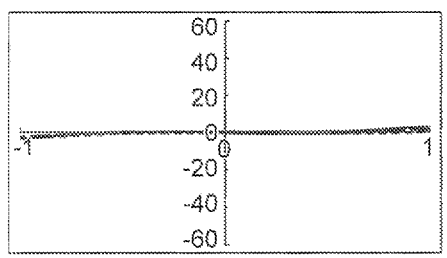
Figure 13C:
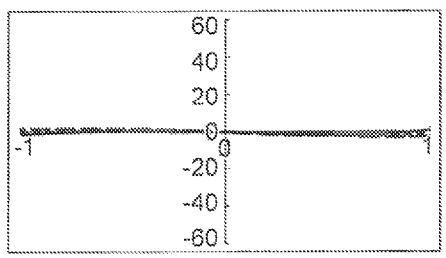
Figure 13F:
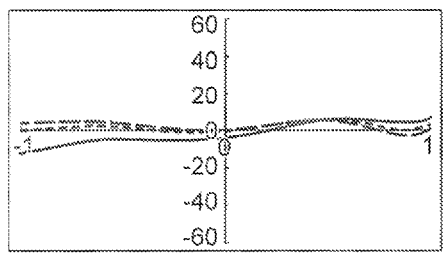

FIGS. 12A to 12F and FIGS. 13A to 13F illustrate the aberrations in the application example 3. Specifically, FIGS. 12A and 12B indicate the aberration in Y and X directions in the direction of 10° in the X direction and 5.7° in the Y direction, and FIGS. 12C and 12D indicate the aberration in Y and X directions in the direction of 0.0° in the X direction and 5.7° in the Y direction, and FIGS. 12E and 12F indicate the aberration in Y and X directions in the direction of −10° in the X direction and 5.7° in the Y direction. FIGS. 13A and 13B indicate the aberration in Y and X directions in the direction of 10° in the X direction and 0.0° in the Y direction, FIGS. 13C and 13D indicate the aberration in Y and X directions in the direction of 0.0° in the X direction and 0.0° in the Y direction, and FIGS. 13E and 13F indicate the aberration in Y and X directions in the direction of −10° in the X direction and 0.0° in the Y direction.

Application Example 4

Data for optical surface that configures the prism and the projection lens of the projection fluoroscope in the application example 4 is shown in Table 13 below.

TABLE 13

| No | Type | R | T | Nd | Vd |
|---|---|---|---|---|---|
| 1 | SPH | ∞ | 22.00 | | |
| 2 | FFS1 | −32.954 | 5.50 | 1.525 | 55.95 |
| 3 | FFS2 | −29.700 | −5.50 | 1.525 | 55.95 |
| 4 | FFS1 | −32.954 | 9.00 | 1.525 | 55.95 |
| 5 | FFS3 | −34.327 | −9.00 | 1.525 | 55.95 |
| 6 | FFS1 | −32.954 | 5.70 | 1.525 | 55.95 |
| 7 | FFS4 | −35.584 | 6.00 | | |
| 8 | SPH | ∞ | −10.00 | | |
| 9 | ASP1 | −11.550 | −7.50 | 1.525 | 55.95 |
| 10 | ASP2 | 7.019 | −0.52 | | |
| 11 | ASP3 | 5.809 | −1.50 | 1.585 | 29.90 |
| 12 | ASP4 | 24.036 | −19.81 | | |
| 13 | ASP5 | −15.474 | −5.00 | 1.525 | 55.95 |
| 14 | ASP6 | 150.859 | −10.57 | | |

TABLE 13-continued

| No | Type | R | T | Nd | Vd |
|----|------|---|---|----|----|
| 15 | SPH | ∞ | −1.44 | 1.458 | 67.82 |
| 16 | image surface | | | | |

Regarding the optical surface of the prism that configures the application example 4, the inclination angle (tilt) TLY of the optical axis in the cross-section surface thereof, and the amount of shift (de-centered) DCX of the optical axis is shown in Table 14 described below.

TABLE 14

| No | Type | TLY (front) | DCX (back) | TLY (back) |
|----|------|-------------|------------|------------|
| 2 | FFS1 | 0 | 0 | 0 |
| 3 | FFS2 | −24.5 | 0 | 24.5 |
| 4 | FFS1 | 0 | 0 | 0 |
| 5 | FFS3 | 0 | 0 | 0 |
| 6 | FFS1 | 0 | 32.88 | 60.5 |
| 7 | FFS4 | 0 | 0 | 0 |
| 8 | SPH | −40.0 | 0 | −40.0 |

Regarding each optical surface of the prism that configures the application example 4, the coefficient expressed by the expanded polynomial of the free-curved surface is shown in Table 15 below. Here, in Table 15, the symbols m and n mean the variables or the orders in the coefficient $Ak_{m,n}$. In addition, the symbol FFSk (k=1 to 4) means the $k_{th}$ surface among the first to fourth surfaces S11 to S14 which are the free-curved surfaces.

TABLE 15

| m | n | FFS1 | FFS2 | FFS3 | FFS4 |
|---|---|------|------|------|------|
| 2 | 0 | −1.517E−02 | −1.683E−02 | −1.457E−02 | −1.405E−02 |
| 0 | 2 | −1.755E−02 | −1.476E−02 | −1.669E−02 | −2.581E−02 |
| 3 | 0 | 3.604E−05 | 1.262E−04 | 2.444E−05 | 1.522E−03 |
| 1 | 2 | 3.632E−04 | 1.318E−04 | 2.463E−04 | 2.222E−03 |
| 4 | 0 | 2.963E−06 | −9.589E−06 | 1.523E−06 | −8.319E−05 |
| 2 | 2 | 5.382E−08 | −5.527E−06 | 2.765E−08 | −1.572E−04 |
| 0 | 4 | −6.623E−05 | −1.237E−05 | −3.403E−05 | −3.003E−04 |
| 5 | 0 | −5.813E−07 | 4.830E−07 | −2.263E−07 | 2.342E−05 |
| 3 | 2 | 9.087E−08 | 3.401E−08 | 3.538E−08 | 4.998E−05 |
| 1 | 4 | 5.827E−06 | 1.234E−06 | 2.268E−06 | −2.976E−05 |
| 6 | 0 | 1.569E−08 | −4.329E−08 | 4.626E−09 | 3.039E−06 |
| 4 | 2 | 2.522E−08 | −7.425E−08 | 7.438E−09 | 5.602E−06 |
| 2 | 4 | −3.708E−07 | −2.749E−07 | −1.093E−07 | −2.362E−06 |
| 0 | 6 | 4.509E−07 | −6.470E−08 | 1.330E−07 | −7.030E−06 |

The coefficient of the aspherical surface of the optical surface that configures the projection lens of the projection fluoroscope in the application example 4 is shown in Table 16 below.

TABLE 16

| | ASP1 | ASP2 | ASP3 |
|---|------|------|------|
| K | 0 | 0 | 0 |
| B4 | −2.404E−04 | −4.055E−04 | −1.768E−03 |
| B6 | 2.816E−08 | −2.656E−05 | −1.811E−05 |
| B8 | 9.329E−09 | 5.829E−07 | 8.203E−07 |

| | ASP4 | ASP5 | ASP6 |
|---|------|------|------|
| K | 0 | 0 | 0 |
| B4 | −1.863E−03 | 5.109E−05 | 2.894E−05 |
| B6 | −1.888E−05 | 2.193E−06 | 1.642E−06 |
| B8 | −8.214E−07 | 9.147E−09 | 5.793E−09 |

In Table 16 described above, the symbols K and Bi indicate the coefficients for specifying an aspherical surface out of the aspherical surfaces APS1 to APS6 which are the lens surfaces of three lenses 31 to 33 that configure the projection lens 30.

Figure 14:
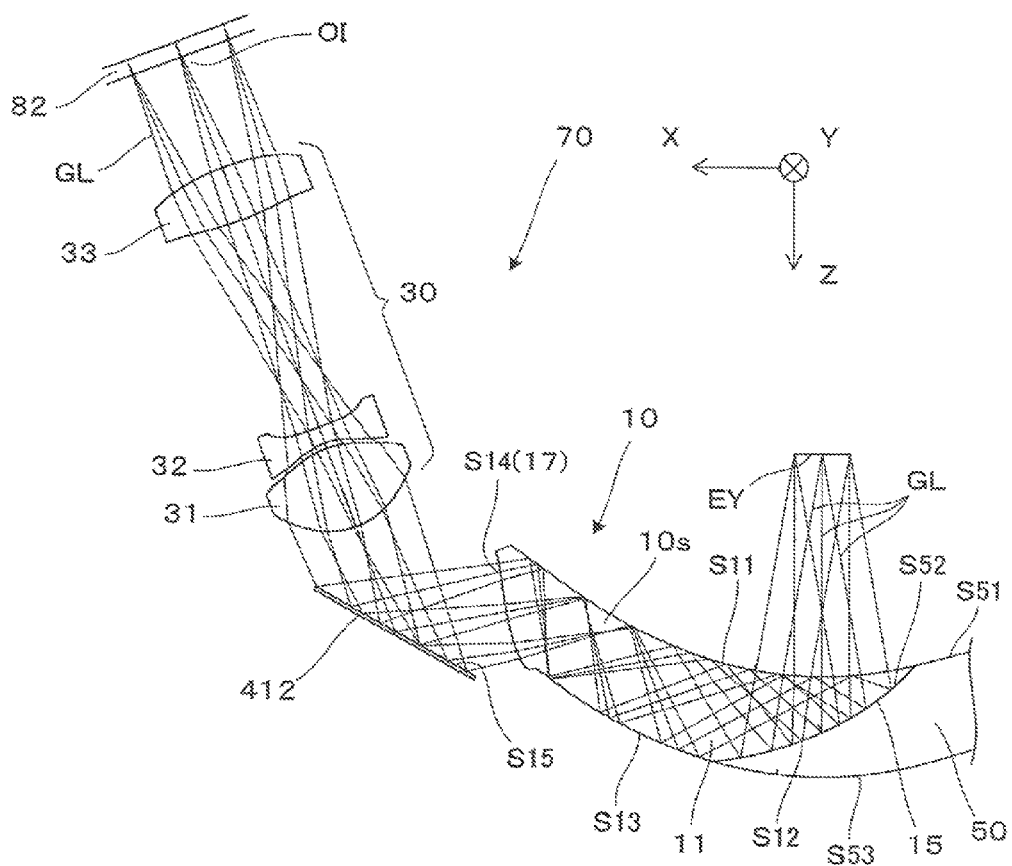
FIG. 14 is a diagram illustrating an optical system in Application Example 4.
Figure 15A:
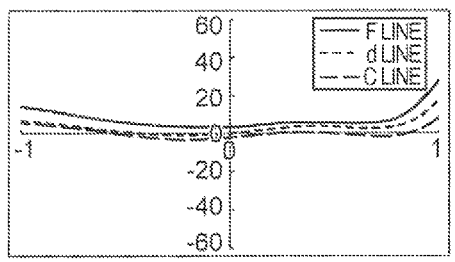
FIGS. 15A to 15F are diagrams illustrating aberrations of an optical system in Application Example 4.
Figure 15D:
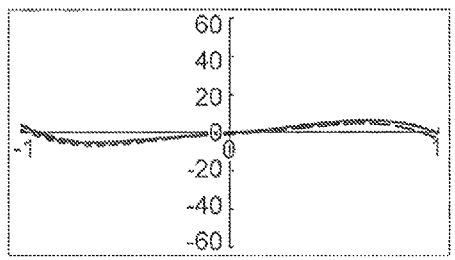
Figure 15B:
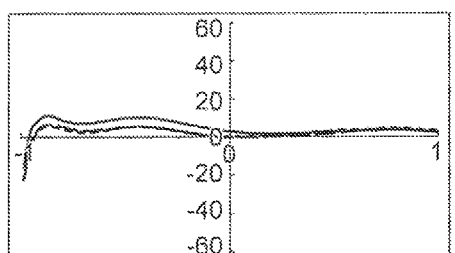
Figure 15E:
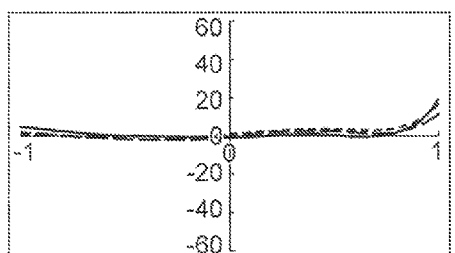
Figure 15C:
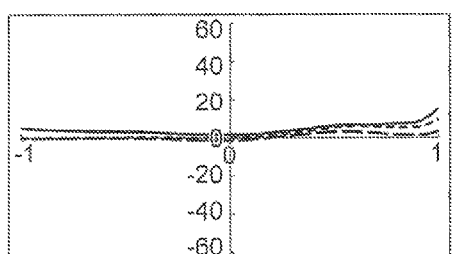
Figure 15F:
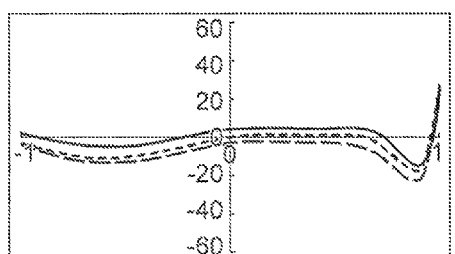

FIG. 14 is a cross-sectional diagram of the projection fluoroscope 70 in the application example 4. Particularly here, the projection fluoroscope 70 includes a reflection mirror 412 in addition to the prism 10 and performs the light guide of the image light GL by a cooperation of the prism 10 and the reflection mirror 412. The prism 10 of the projection fluoroscope 70 includes the first surface S11 that has a relatively weak negative refractive power, the second surface S12 that has a relatively strong positive refractive power, the third surface S13 that has a relatively weak positive refractive power, and the fourth surface S14 that has a relatively strong positive refractive power. The reflection mirror 412 of the projection fluoroscope 70 includes a fifth surface S15 that has a flat reflective surface. The projection lens 30 includes a first lens 31 that has a positive refractive power, a second lens 32 that has a negative refractive power, a third lens 33 that has a positive refractive power. In the projection fluoroscope 70, the reflection mirror 412 reflects the image light GL at the fifth surface S15, and causes the image light GL to be guided to the fourth surface S14 which is the light incident surface among the first to fourth surfaces S11 to S14 of the prism 10. The prism 10 causes the image light GL incident from the fourth surface S14 to be reflected at surfaces in the order of the first surface S11, the third surface S13, and the first surface S11 and the second surface S12 in this order to be emitted from the first surface S11. The detailed specification of the optical system in the application example 4 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 16A:
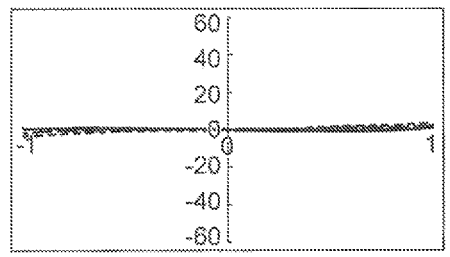
FIGS. 16A to 16F are diagrams illustrating aberrations of the optical system in Application Example 4.
Figure 16D:
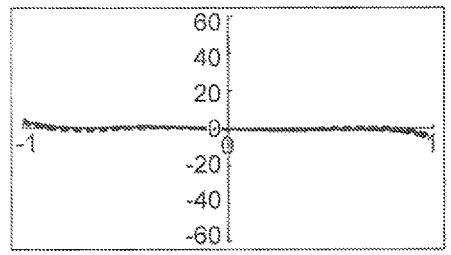
Figure 16B:
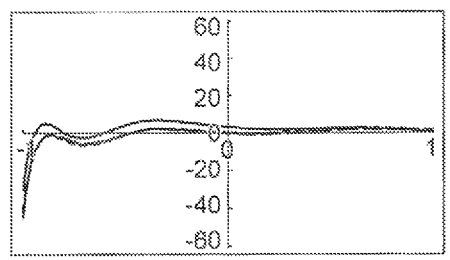
Figure 16E:
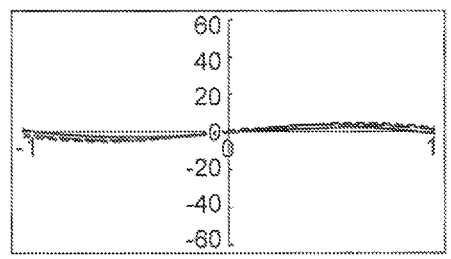
Figure 16C:
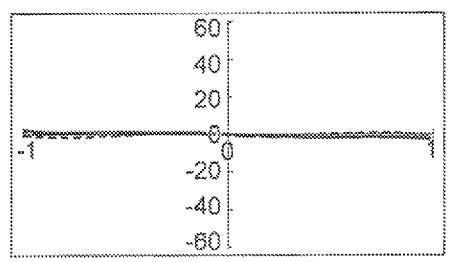
Figure 16F:
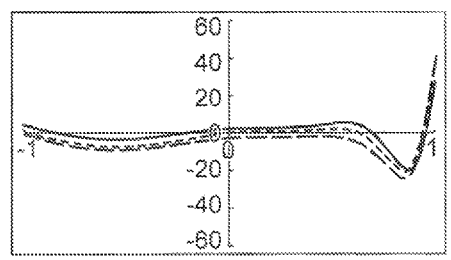

FIGS. 15A to 15F and FIGS. 16A to 16F illustrate the aberrations in the application example 4. Specifically, FIGS. 15A and 15B indicate the aberration in Y and X directions in the direction of 10° in the X direction and 5.7° in the Y direction, and FIGS. 15C and 15D indicate the aberration in Y and X directions in the direction of 0.0° in the X direction and 5.7° in the Y direction, and FIGS. 15E and 15F indicate the aberration in Y and X directions in the direction of −10° in the X direction and 5.7° in the Y direction. FIGS. 16A and 16B indicate the aberration in Y and X directions in the direction of 10° in the X direction and 0.0° in the Y direction, FIGS. 16C and 16D indicate the aberration in Y and X directions in the direction of 0.0° in the X direction and 0.0° in the Y direction, and FIGS. 16E and 16F indicate the aberration in Y and X directions in the direction of −10° in the X direction and 0.0° in the Y direction.

Application Example 5

Data for optical surface that configures the prism and the projection lens of the projection fluoroscope in the application example 5 is shown in Table 17 below.

TABLE 17

| No | Type | R | T | Nd | Vd |
|----|------|---|---|----|-----|
| 1 | SPH | ∞ | 20.00 | | |
| 2 | FFS1 | −98.704 | 6.00 | 1.525 | 55.95 |
| 3 | FFS2 | −58.956 | −6.00 | 1.525 | 55.95 |
| 4 | FFS1 | −98.704 | 9.50 | 1.525 | 55.95 |
| 5 | FFS3 | −108.204 | −9.50 | 1.525 | 55.95 |
| 6 | FFS1 | −98.704 | −0.50 | 1.525 | 55.95 |
| 7 | FFS4 | −47.100 | −7.00 | 1.525 | 55.95 |
| 8 | FFS5 | −11.579 | −2.00 | | |

TABLE 17-continued

| No | Type | R | T | Nd | Vd |
|----|------|------|-------|-------|-------|
| 9  | ASP1 | −5.685 | −4.50 | 1.525 | 55.95 |
| 10 | ASP2 | 13.633 | −6.32 | | |
| 11 | ASP3 | −6.442 | −4.50 | 1.525 | 55.95 |
| 12 | ASP4 | 21.141 | −3.93 | | |
| 13 | SPH  | ∞ | −1.44 | 1.458 | 67.82 |
| 14 | image surface | | | | |

Regarding the optical surface of the prism that configures the application example 5, the inclination angle (tilt) TLY of the optical axis in the cross-section surface thereof, and the amount of shift (de-centered) DCX of the optical axis is shown in Table 18 described below.

TABLE 18

| No | Type | TLY (front) | DCX (back) | TLY (back) |
|----|------|-------------|------------|------------|
| 2 | FFS1 | 0 | 0 | 0 |
| 3 | FFS2 | −24.5 | 0 | 24.5 |
| 4 | FFS1 | 0 | 0 | 0 |
| 5 | FFS3 | 0 | 0 | 0 |
| 6 | FFS1 | 0 | 40.24 | 71.3 |
| 7 | FFS4 | −40.00 | 0 | −40.0 |
| 8 | FFS5 | 0 | 0 | 0 |

Regarding each optical surface of the prism that configures the application example 5, the coefficient expressed by the expanded polynomial of the free-curved surface is shown in Table 19 below. Here, in Table 19, the symbols m and n mean the variables or the orders in the coefficient $Ak_{m,n}$. In addition, the symbol FFSk (k=1 to 5) means the $k_{th}$ surface among the first to fifth surfaces S11 to S15 which are the free-curved surfaces.

TABLE 19

| M | n | FFS1 | FFS2 | FFS3 | FFS4 | FFS5 |
|---|---|------|------|------|------|------|
| 2 | 0 | −5.066E−03 | −8.481E−03 | −4.621E−03 | −1.062E−02 | −4.318E−02 |
| 0 | 2 | −2.813E−02 | −1.024E−02 | −2.768E−02 | −7.659E−03 | 6.692E−02 |
| 3 | 0 | −1.328E−05 | −3.271E−05 | −1.328E−05 | −2.193E−05 | −1.553E−03 |
| 1 | 2 | 3.075E−04 | −3.653E−05 | 3.075E−04 | −7.032E−04 | −6.202E−05 |
| 4 | 0 | −1.763E−06 | −2.691E−06 | −1.763E−06 | 2.618E−05 | 9.362E−04 |
| 2 | 2 | −1.325E−05 | −2.995E−06 | −1.325E−05 | 2.887E−05 | 1.044E−03 |
| 0 | 4 | −2.352E−05 | 2.820E−06 | −2.352E−05 | −2.858E−04 | 6.670E−04 |
| 5 | 0 | 6.707E−09 | 3.006E−07 | 6.707E−09 | 2.635E−07 | 2.769E−05 |
| 3 | 2 | 9.765E−08 | −3.825E−08 | 9.765E−08 | 3.725E−06 | 5.488E−05 |
| 1 | 4 | 6.956E−07 | 2.477E−07 | 6.956E−07 | 4.291E−05 | 2.746E−05 |
| 6 | 0 | 7.557E−10 | 8.033E−10 | 7.557E−10 | 5.259E−08 | 1.495E−06 |
| 4 | 2 | −1.250E−09 | 5.397E−08 | −1.250E−09 | 2.206E−07 | 1.519E−05 |
| 2 | 4 | −3.144E−08 | 1.711E−08 | −3.144E−08 | 2.547E−06 | 1.148E−05 |
| 0 | 6 | −4.169E−08 | 1.566E−07 | −4.169E−08 | 3.293E−05 | 5.661E−05 |

The coefficient of the aspherical surface of the optical surface that configures the projection lens of the projection fluoroscope in the application example 5 is shown in Table 20 below.

TABLE 20

|    | ASP1 | ASP2 | ASP3 | ASP4 |
|----|------|------|------|------|
| K  | 0 | 0 | 0 | 0 |
| B4 | −3.443E−04 | 5.227E−06 | −8.350E−04 | −9.652E−04 |
| B6 | 4.806E−06 | −2.924E−05 | −6.766E−05 | 3.562E−06 |
| B8 | 8.512E−07 | 6.652E−07 | −7.330E−07 | −5.339E−06 |

In Table 20 described above, the symbols K and Bi indicate the coefficients for specifying an aspherical surface out of the asperical surfaces APS1 to APS4 which are the lens surfaces of the lenses 31 and 32 that configure the projection lens 30.

Figure 17:
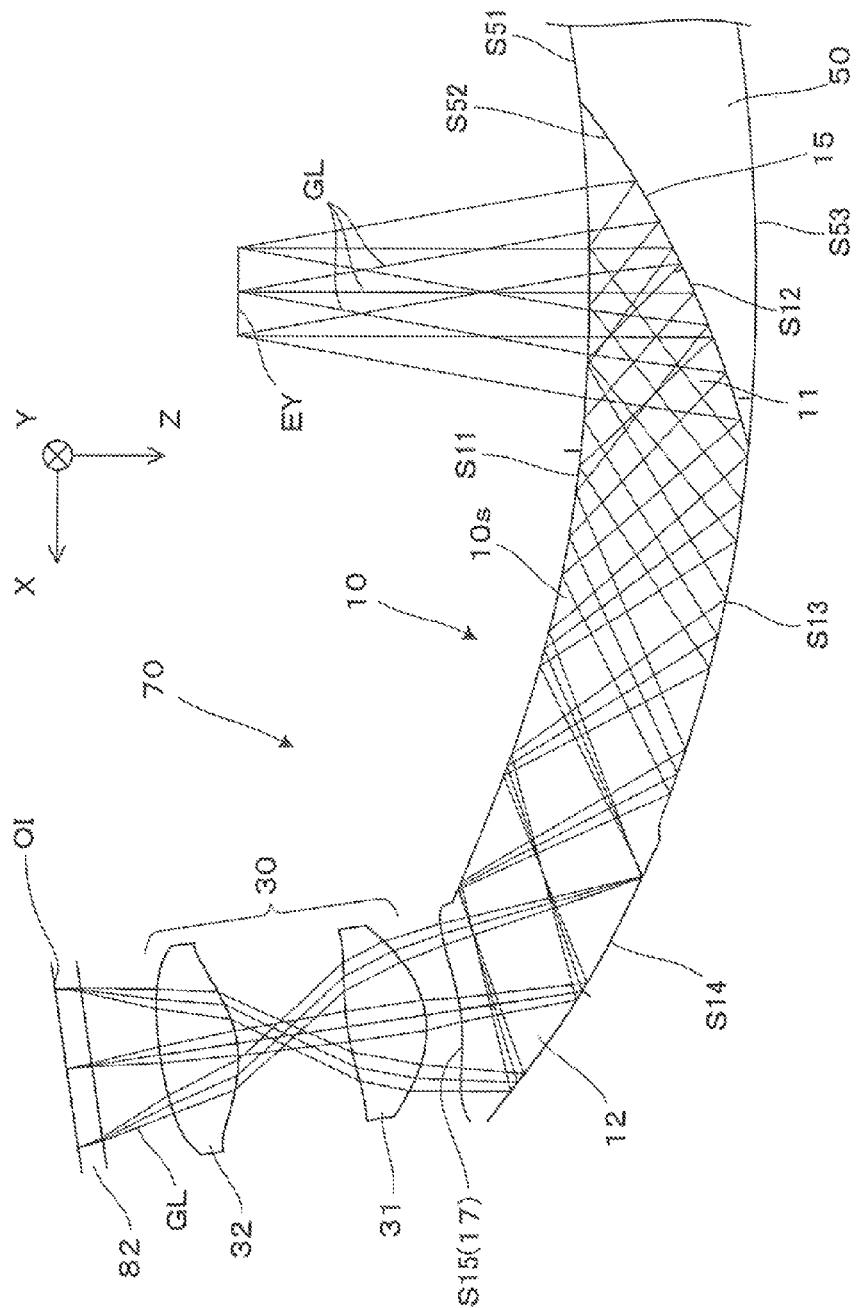
FIG. 17 is a diagram illustrating an optical system in Application Example 5.
Figure 18A:
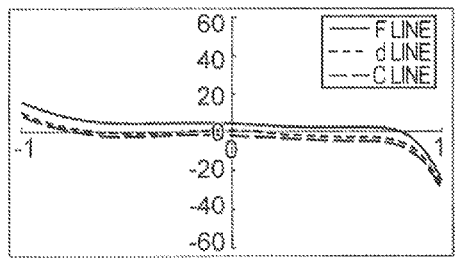
FIGS. 18A to 18F are diagrams illustrating aberrations of an optical system in Application Example 5.
Figure 18D:
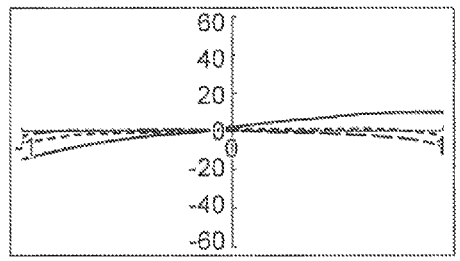
Figure 18B:
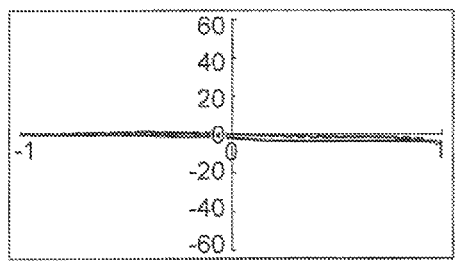
Figure 18E:
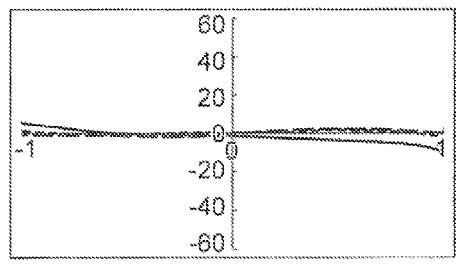
Figure 18C:
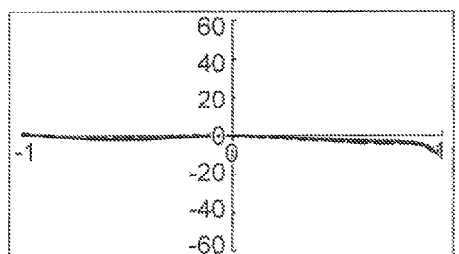
Figure 18F:
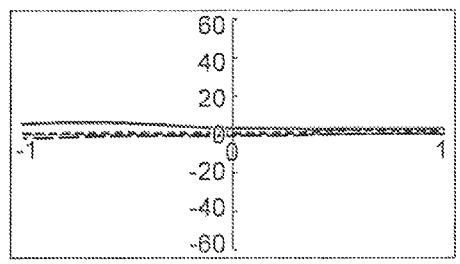

FIG. 17 is a cross-sectional diagram of the projection fluoroscope 70 in the application example 5. The prism 10 of the projection fluoroscope 70 includes the first surface S11 that has a relatively weak negative refractive power, the second surface S12 that has a relatively strong positive refractive power, the third surface S13 that has a relatively weak positive refractive power, the fourth surface S14 that has a relatively weak positive refractive power, and the fifth surface S15 that has a relatively strong positive refractive power. The projection lens 30 includes a first lens 31 that has a positive refractive power and a second lens 32 that has a positive refractive power. The detailed specification of the optical system in the application example 5 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 19A:
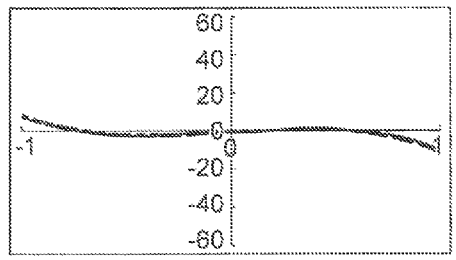
FIGS. 19A to 19F are diagrams illustrating aberrations of the optical system in Application Example 5.
Figure 19D:
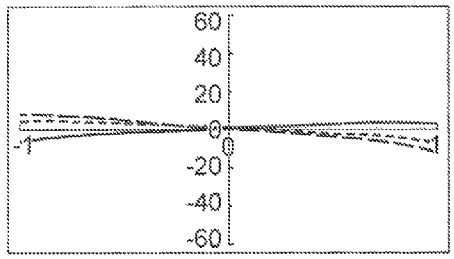
Figure 19B:
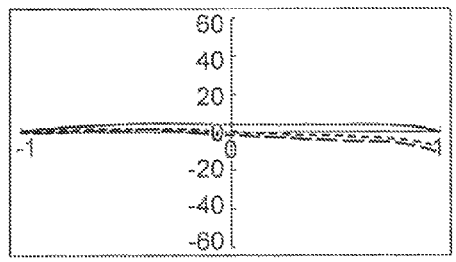
Figure 19E:
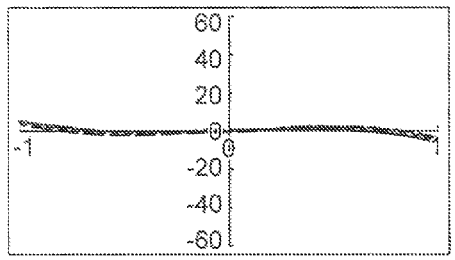
Figure 19C:
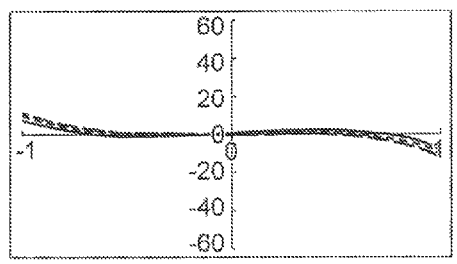
Figure 19F:
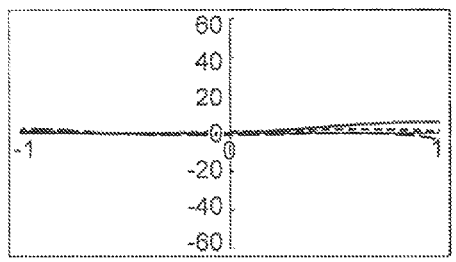

FIGS. 18A to 18F and FIGS. 19A to 19F illustrate the aberrations in the application example 5. Specifically, FIGS. 18A and 18B indicate the aberration in Y and X directions in the direction of 10° in the X direction and 5.7° in the Y direction, and FIGS. 18C and 18D indicate the aberration in Y and X directions in the direction of 0.0° in the X direction and 5.7° in the Y direction, and FIGS. 18E and 18F indicate the aberration in Y and X directions in the direction of −10° in the X direction and 5.7° in the Y direction. FIGS. 19A and 19B indicate the aberration in Y and X directions in the direction of 10° in the X direction and 0.0° in the Y direction, FIGS. 19C and 19D indicate the aberration in Y and X directions in the direction of 0.0° in the X direction and 0.0° in the Y direction, and FIGS. 19E and 19F indicate the aberration in Y and X directions in the direction of −10° in the X direction and 0.0° in the Y direction.

Application Example 6

Data for optical surface that configures the prism and the projection lens of the projection fluoroscope in the application example 6 is shown in Table 21 below.

TABLE 21

| No | Type | R | T | Nd | Vd |
|----|------|------|-------|-------|-------|
| 1  | SPH  | ∞ | 20.00 | | |
| 2  | FFS1 | −66.840 | 6.00 | 1.525 | 55.95 |
| 3  | FFS2 | −53.325 | −6.00 | 1.525 | 55.95 |
| 4  | FFS1 | −66.840 | 10.00 | 1.525 | 55.95 |
| 5  | FFS3 | −76.840 | −10.00 | 1.525 | 55.95 |
| 6  | FFS1 | −66.840 | 1.00 | 1.525 | 55.95 |
| 7  | FFS4 | −112.131 | −10.00 | 1.525 | 55.95 |
| 8  | FFS5 | 11.740 | −12.00 | | |
| 9  | ASP5 | −10.793 | −4.00 | 1.525 | 55.95 |
| 10 | ASP6 | 7.754 | −9.36 | | |
| 11 | SPH | ∞ | 1.44 | 1.458 | 67.82 |
| 12 | image surface | | | | |

Regarding the optical surface of the prism that configures the application example 6, the inclination angle (tilt) TLY of the optical axis in the cross-section surface thereof, and the amount of shift (de-centered) DCX of the optical axis is shown in Table 22 described below.

TABLE 22

| No | Type | TLY (front) | DCX (back) | TLY (bank) |
|---|---|---|---|---|
| 2 | FFS1 | 0 | 0 | 0 |
| 3 | FFS2 | −24.5 | 0 | 24.5 |
| 4 | FFS1 | 0 | 0 | 0 |
| 5 | FFS3 | 0 | 0 | 0 |
| 6 | FFS1 | 0 | 46.10 | 69.8 |
| 7 | FFS4 | −45.0 | 0 | −45.0 |
| 8 | FFS5 | 0 | 0 | 0 |

Regarding each optical surface of the prism that configures the application example 6, the coefficient expressed by the expanded polynomial of the free-curved surface is shown in Table 23 below. Here, in Table 23, the symbols m and n mean the variables or the orders in the coefficient $Ak_{m,n}$. In addition, the symbol FFSk (k=1 to 5) means the $k_{th}$ surface among the first to fifth surfaces S11 to S15 which are the free-curved surfaces.

TABLE 23

| m | n | FFS1 | FFS2 | FFS3 | FFS4 | FFS5 |
|---|---|---|---|---|---|---|
| 2 | 0 | −7.481E−03 | −9.377E−03 | −6.507E−03 | −4.459E−03 | 4.259E−02 |
| 0 | 2 | −2.545E−02 | −1.165E−02 | −2.448E−02 | −6.046E−03 | 8.015E−02 |
| 3 | 0 | 1.398E−04 | 6.007E−05 | 1.398E−04 | 7.912E−05 | −1.401E−04 |
| 1 | 2 | 5.177E−04 | 1.271E−04 | 5.177E−04 | −2.231E−04 | −6.066E−04 |
| 4 | 0 | −6.372E−06 | −5.729E−06 | −6.372E−06 | 1.169E−05 | −1.076E−04 |
| 2 | 2 | −2.569E−05 | −9.491E−06 | −2.569E−05 | 1.085E−05 | −4.617E−04 |
| 0 | 4 | −2.828E−05 | 8.801E−07 | −2.828E−05 | −5.499E−05 | −4.393E−04 |
| 5 | 0 | 1.606E−07 | 4.131E−07 | 1.606E−07 | 4.131E−08 | 2.632E−06 |
| 3 | 2 | 5.796E−07 | 4.177E−07 | 5.796E−07 | 1.050E−06 | 2.188E−05 |
| 1 | 4 | 1.513E−06 | −1.464E−07 | 1.513E−06 | 1.375E−06 | −2.168E−05 |
| 6 | 0 | −1.245E−09 | −2.795E−08 | −1.245E−09 | −8.903E−09 | −4.654E−08 |
| 4 | 2 | −7.303E−09 | 1.513E−08 | −7.303E−09 | 2.144E−07 | 4.435E−06 |
| 2 | 4 | −4.664E−08 | 1.183E−07 | −4.664E−08 | −7.960E−07 | 5.500E−07 |
| 0 | 6 | 6.966E−09 | 6.115E−08 | 6.966E−09 | 1.735E−06 | 1.313E−05 |

The coefficient of the aspherical surface of the optical surface that configures the projection lens of the projection fluoroscope in the application example 6 is shown in Table 24 below.

TABLE 24

| | ASP1 | ASP2 |
|---|---|---|
| K | 0 | 0 |
| B4 | 5.366E−04 | −7.685E−04 |
| B6 | −5.608E−06 | 5.491E−05 |
| B8 | −7.644E−07 | −1.925E−06 |

In Table 24 described above, the symbols K and Bi indicate the coefficients for specifying an aspherical surface out of the asperical surfaces APS1 and APS2 which is a lens surfaces of one lens 31 that configures the projection lens 30.

Figure 20:
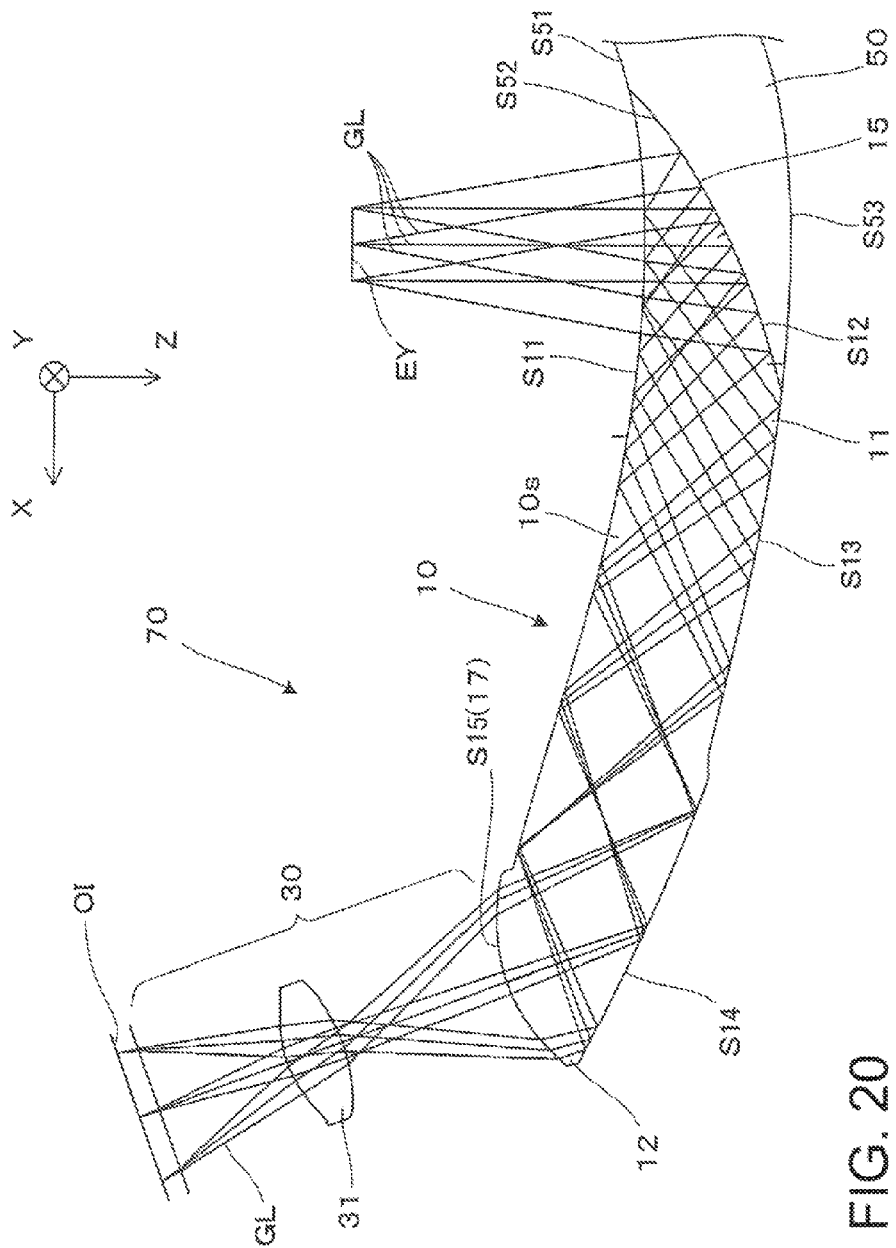
FIG. 20 is a diagram illustrating an optical system in Application Example 6.
Figure 21A:
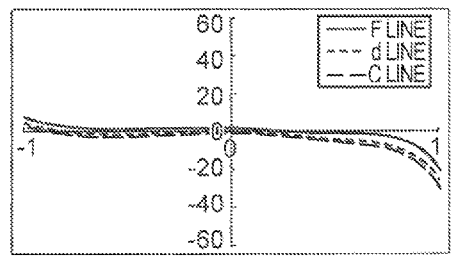
FIGS. 21A to 21F are diagrams illustrating aberrations of an optical system in Application Example 6.
Figure 21D:
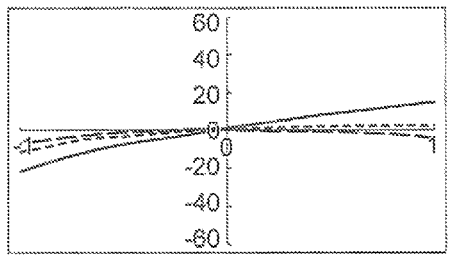
Figure 21B:
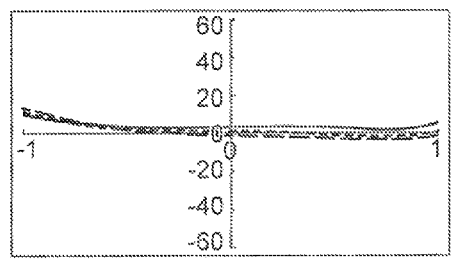
Figure 21E:
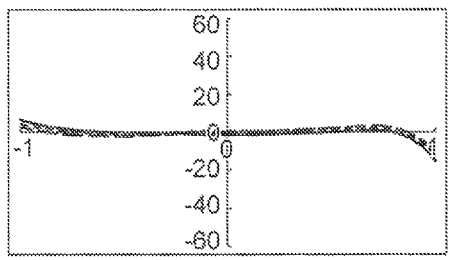
Figure 21C:
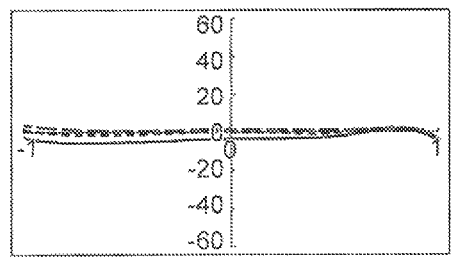
Figure 21F:
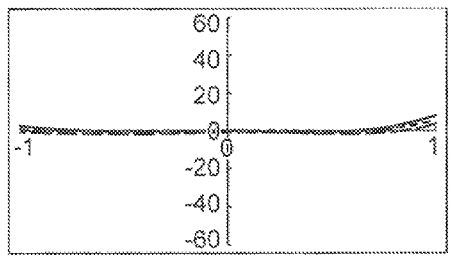

FIG. 20 is a cross-sectional diagram of the projection fluoroscope 70 in the application example 6. The prism 10 of the projection fluoroscope 70 includes the first surface S11 that has a relatively weak negative refractive power, the second surface S12 that has a relatively strong positive refractive power, the third surface S13 that has a relatively weak positive refractive power, the fourth surface S14 that has a relatively weak positive refractive power, and the fifth surface S15 that has a relatively strong positive refractive power. The projection lens 30 includes a first lens 31 that has a positive refractive power. The detailed specification of the optical system in the application example 6 will be described. A horizontal angle of view is 20.1°, a vertical angle of view is 11.4°, a size of the display area of the image display element is 9.22×5.18 mm, a diameter of a pupil is 5 mm, and a focal length is approximately 26 mm.

Figure 22A:
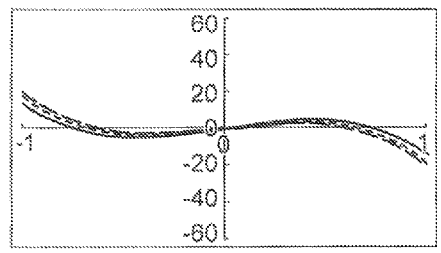
FIGS. 22A to 22F are diagrams illustrating aberrations of the optical system in Application Example 6.
Figure 22D:
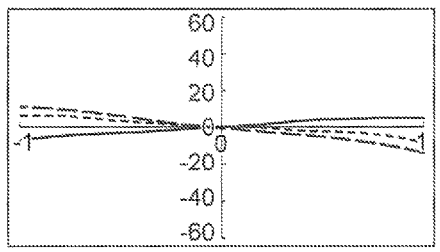
Figure 22B:
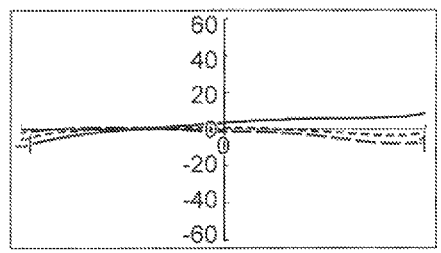
Figure 22E:
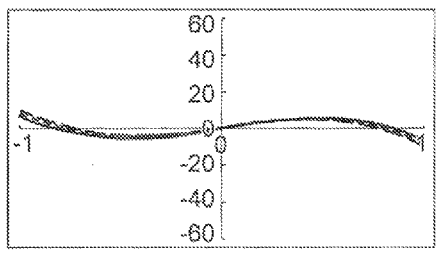
Figure 22C:
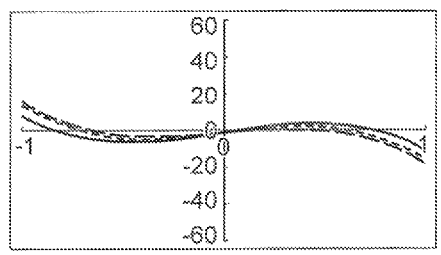
Figure 22F:
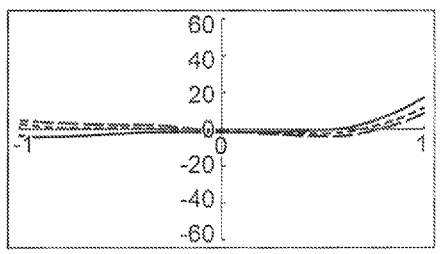

FIGS. 21A to 21F and FIGS. 22A to 22F illustrate the aberrations in the application example 6. Specifically, FIGS. 21A and 21B indicate the aberration in Y and X directions in the direction of 10° in the X direction and 5.7° in the Y direction, and FIGS. 21C and 21D indicate the aberration in Y and X directions in the direction of 0.0° in the X direction and 5.7° in the Y direction, and FIGS. 21E and 21F indicate the aberration in Y and X directions in the direction of −10° in the X direction and 5.7° in the Y direction. FIGS. 22A and 22B indicate the aberration in Y and X directions in the direction of 10° in the X direction and 0.00 in the Y direction, FIGS. 22C and 22D indicate the aberration in Y and X directions in the direction of 0.0° in the X direction and 0.0° in the Y direction, and FIGS. 22E and 22F indicate the aberration in Y and X directions in the direction of −10° in the X direction and 0.0° in the Y direction.

In Table 25 below, numeric data related to conditional expressions 1 to 3 with regard to each of the application examples 1 to 6 is summarized. In this case, the coefficients below satisfy any of the conditional expressions (1) to (3).

TABLE 25

| | Application example 1 | Application example 2 | Application example 3 | Application example 4 | Application example 5 | Application example 6 |
|---|---|---|---|---|---|---|
| $A1_{2,0}$ | −5.080E−03 | −1.223E−02 | −1.357E−04 | −1.517E−02 | −5.066E−03 | −7.481E−03 |
| $A1_{0,2}$ | −1.008E−02 | −1.580E−02 | −1.360E−02 | −1.755E−02 | −2.813E−02 | −2.545E−02 |
| $A3_{2,0}$ | −1.168E−02 | −1.609E−02 | −8.252E−03 | −1.683E−02 | −8.481E−03 | −9.377E−03 |
| $A3_{0,2}$ | −1.174E−02 | −1.540E−02 | −1.210E−02 | −1.476E−02 | −1.024E−02 | −1.165E−02 |
| $A1_{2,0} + A1_{0,2}$ | −1.516E−02 | −2.803E−02 | −1.374E−02 | −3.272E−02 | −3.320E−02 | −3.293E−02 |
| $A3_{2,0} + A3_{0,2}$ | −2.342E−02 | −3.149E−02 | −2.035E−02 | −3.160E−02 | −1.872E−02 | −2.102E−02 |
| $A1_{2,0} + A1_{0,2}$ | 4.997E−03 | 3.576E−03 | 1.346E−02 | 2.377E−03 | 2.306E−02 | 1.797E−02 |
| $A1_{2,0} + A3_{2,0}$ | 6.605E−03 | 3.863E−03 | 8.117E−03 | 1.662E−03 | 3.415E−03 | 1.896E−03 |
| $A1_{0,2} + A3_{0,2}$ | 1.662E−03 | −4.009E−04 | −1.502E−03 | −2.785E−03 | −1.789E−02 | −1.380E−02 |

In addition, in Table 26 below, with regard to the application example 1 to 6, respectively, numeric data related to a gap between the first surface S11 and the third surface S13 and an inclination angle of the second surface S12 with respect to the first surface S11 are summarized.

TABLE 25

|  | Application example 1 | Application example 2 | Application example 3 | Application example 4 | Application example 5 | Application example 6 |
| --- | --- | --- | --- | --- | --- | --- |
| gap between S11 and S13 (mm) | 9.00 | 9.00 | 9.00 | 9.00 | 9.50 | 10.00 |
| inclination angle of S12 to S11 (°) | 24.5 | 24.5 | 26 | 24.5 | 24.5 | 24.5 |

In addition, the visibility of the prism with respect to the external light is influenced based on the conditional expression (3) as follows. When the thickness of the prism is T and the refractive index is N (=Nd (each application example)), the visibility Dx in the x axis direction on the optical axis of the prism and the visibility Dy in the y axis direction are influenced according to:

$$Dx = 2000(N-1)(A1_{2,0} - A3_{2,0} + (2T(N-1)/N) \times A1_{2,0} \times A3_{2,0})$$

$$Dx = 2000(N-1)(A1_{0,2} - A3_{0,2} + (2T(N-1)/N) \times A1_{0,2} \times A3_{0,2})$$

Based on above expression, numeric data related to the visibility in each of the application examples 1 to 6 is summarized in Table 27.

TABLE 27

|  | Application example 1 | Application example 2 | Application example 3 | Application example 4 | Application example 5 | Application example 6 |
| --- | --- | --- | --- | --- | --- | --- |
| visibility Dx (D: Diopter) | 0.74 | 0.55 | 0.85 | 0.36 | 0.39 | 0.25 |
| visibility Dy (D: Diopter) | 0.26 | 0.13 | −0.04 | −0.11 | −1.67 | −1.24 |
| thickness of prism (mm) | 10 | 10 | 10 | 10 | 10 | 10 |
| refractive index N | 1.525 | 1.525 | 1.525 | 1.525 | 1.525 | 1.525 |

Others

The invention is described with reference to each embodiment above. However, the invention is not limited to the embodiments described above, a variety of embodiments can be implemented as long as they do not depart from the scope and spirit of the invention.

In the description above, the half mirror layer 15 (transflective film) is formed in the horizontally long rectangular area. However, the contour of the half mirror layer 15 can be suitably changed based on the usage or other uses. In addition, the transmittance and the reflectance of the half mirror layer 15 can also be changed based on the usage or others.

In the description above, a distribution of the display brightness is not particularly adjusted in the image display element 82. However, in a case where a difference in the brightness occurs based on the position, the distribution of the display brightness can be adjusted to be uneven.

In the description above, the image display element 82 made from a transmission type liquid crystal display device or the like is used as the image display device 80. However, various devices can be used as the image display device 80 without being limited to the image display element 82 made from a transmission type liquid crystal display device or the like. For example, a reflection type liquid crystal display device can be used to configure the image display device 80. Alternatively, instead of the image display element 82 made from a transmission type liquid crystal display device or the like, a digital micro mirror device can also be used. In addition, a self-emitting element represented by such as an LED array or an OLED (organic EL) can also be used as the image display device 80.

In the description above, the image display device 80 made from the transmission type liquid crystal display device or the like. However, instead of this, a scanning type image display device can also be used.

Figure 23:
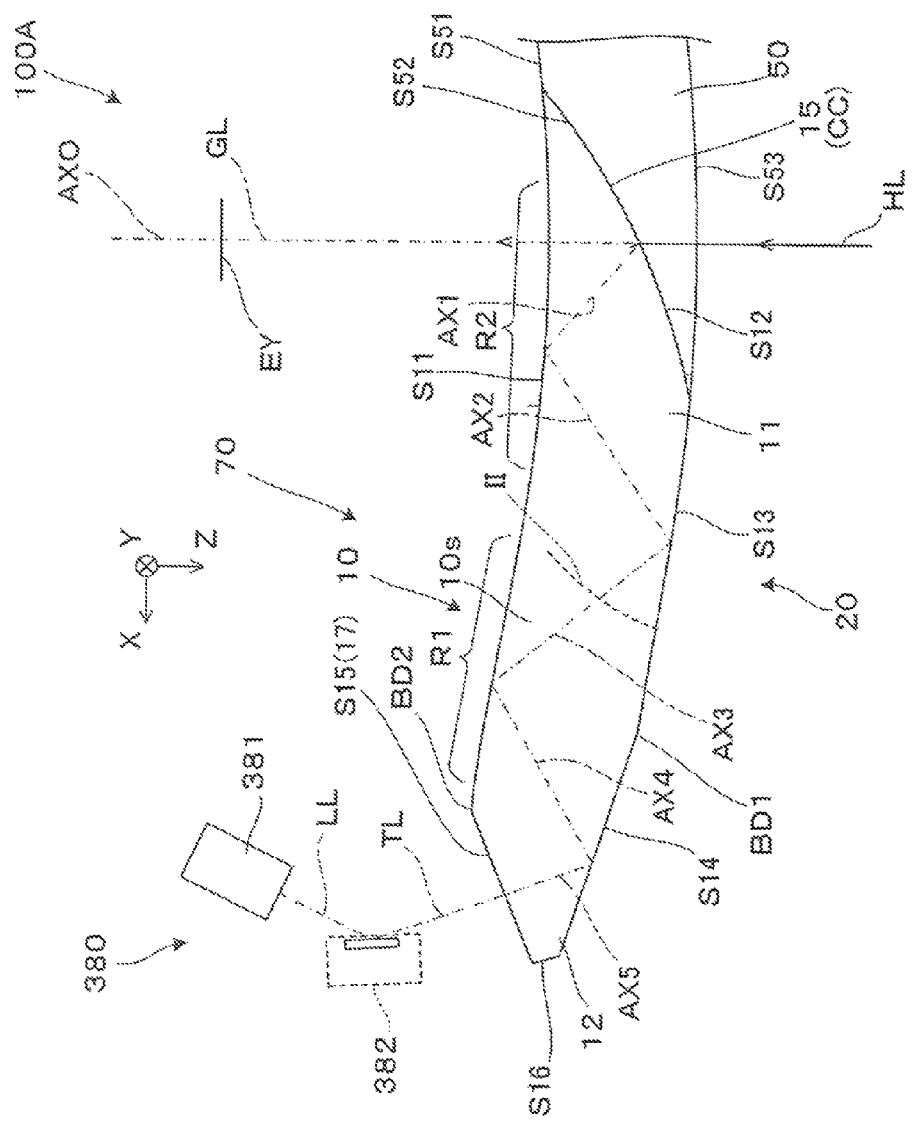
FIG. 23 is a diagram illustrating a virtual image display device in modification example.

Specifically, as illustrated in FIG. 23, the first display device 100A as a virtual image display device includes a light guide section 20 and an image display device 380. The light guide section 20 corresponds to the first optical portion 103a in FIG. 1 in the embodiment described above. That is, since the light guide section 20 corresponds to the combination of the prism 10 and the light transmitting member 50, the description will be omitted here. The image display device 380 is a device that forms an intensity-modulated signal light and emits the signal light as a scanning light TL, and includes a signal light forming section 381 and a scanning optical system 382.

The signal light forming section 381 includes a light source, and emits a signal light LL which is modulated and formed based on a control signal from a not-illustrated control circuit. The scanning optical system 382 scans and emits the signal light LL that passed through the signal light forming section 381. Here, the scanning optical system 382 is formed of a MEMS mirror or the like, and synchronizes the signal light LL from the signal light forming section 381 to the modulation to change the posture, and adjusts the light path of the signal light LL, and then performs a two dimensional scanning to change the emission angle of the light (scanning light TL) in horizontal and vertical. In this way, the image display device 380 causes the scanning light TL which is to be the image light GL to be incident on the light guide section 20, and to be scanned with respect to all the partial area in which the half mirror layer 15 of the second surface S12 is formed.

The operation of the illustrated first display device 100A will be described. The image display device 380 emits the signal light LL toward the fifth surface S15 of the light guide section 20 as the scanning light TL as described above. The light guide section 20 internally guides the scanning light TL which passed through the fifth surface S15, to arrive at the half mirror layer 15. At this time, the scanning light TL is scanned on the surface of the half mirror layer 15, and then, a virtual image is formed by the image light GL as a trajectory of the scanning light TL. The eyes EY of the wearer of the device take the virtual image, and then the virtual image is recognized. Moreover, in the illustrated case, the fifth surface S15 which is the light incident surface among the light guide section 20 is vertical plane with respect to the optical axis of the scanning light TL. In addition, the fourth surface S14 also is a flat plane.

Figure 24A:
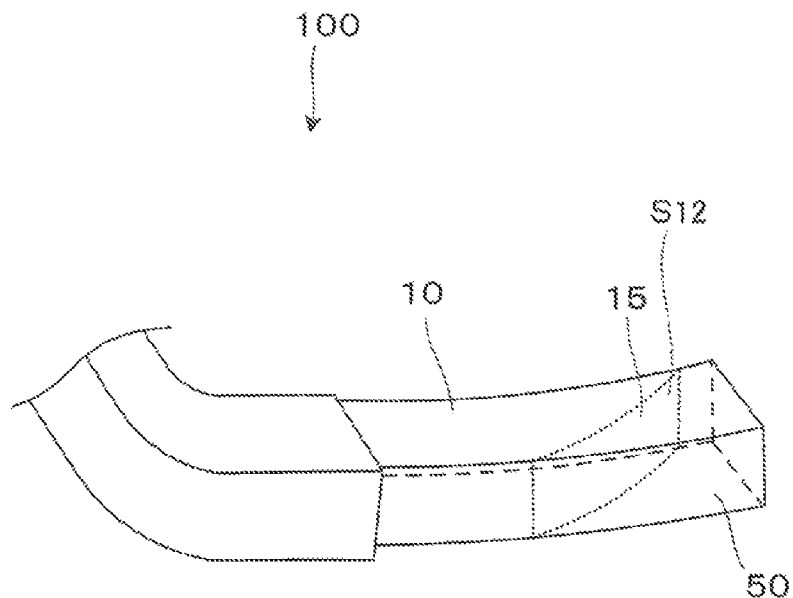
FIG. 24A is a perspective view illustrating a light guide device and another example of a virtual image display device using the a light guide device.
Figure 24B:
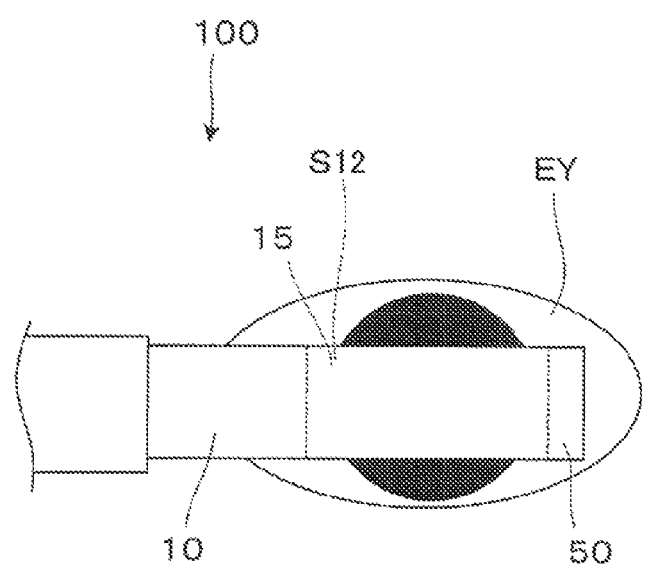
FIG. 24B is a front view thereof.

In addition, in the above-described embodiment, the device is configured such that the prism 10 which is a light guide member and the light transmitting member 50 which is an auxiliary prism cover the entire front of the eyes EY of the wearer, but is not limited thereto. For example, as illustrated in FIGS. 24A and 24B, the device may be configured in such a manner that a part that includes the second surface S12 which has a curved surface shape having the half mirror layer 15 covers only a part of eyes EY, that is, covers a part of eye front, thus, the device may be configured in such a small type that there is also an uncovered part. In addition, in this case, even with a configuration in which a total reflective mirror instead of the half mirror layer 15 is disposed, by making the prism 10 and the light transmitting member 50 sufficiently small, the outside can be observed from the periphery of the prism 10 and the light transmitting member 50, without observing by the see-through. In addition, in the illustrated case, the half mirror layer 15 is formed on the entire or substantially entire surface of the second surface S12. However, the half mirror layer 15 may be formed on only a part of the second surface S12. In addition, in the example in FIG. 24B, the half mirror layer 15 is disposed on the substantially front of the eyes EY. However, the half mirror layer 15 may be disposed on a position shifted from in front of the eyes EY to make the image visible by moving the line sight. For example, the position of the eyes EY may be somewhat lowered (the position of the prism 10 and the light transmitting member 50 may be somewhat raised). In this case, for example, the lower half of the eyes EY is in a state to be seen from the bottom of the prism 10 and the light transmitting member 50.

In the above description, the virtual image display device 100 that includes a pair of display devices 100A and 100B is described, but a single display device may also be included. That is, it is not necessary to provide sets of the projection fluoroscope 70 and the image display device 80 corresponding to both of right eye and left eye. The projection fluoroscope 70 and the image display device 80 only for any one of the right eye or left eye may be provided, and then the device may be configured to see the image in a single-eye view.

In the above description, a gap between the pair of display device 100A and 100B in the X direction is not described. However, the gap between the two display devices 100A and 100B is not limited, and it is possible to adjust the gap by a machine or mechanism. That is, it is possible to adjust the gap between the two display devices 100A and 100B based on the eye width of the wearer.

In the above description, the half mirror layer 15 is merely a transflective film (for example, a metal reflective film or a dielectric multilayer film). However, the half mirror layer 15 can be replaced by a plane or a curved hologram element.

In the above description, a detail description is performed under the assumption that the virtual image display device 100 is a head-mounting display. However, the virtual image display device 100 can be modified to a head-up display.

In the above description, in the first surface S11 and the third surface S13 of the prism 10, the image light is totally reflected and guided by the interface of the surface and the air without applying a mirror or a half mirror. However, the total reflection in the virtual image display device 100 according to the invention includes the reflection reflected at the mirror coating or a half mirror film formed on the entire or a part of the first surface S11 or the third surface S13. For example, a case is included, in which the incident angle of the image light satisfies the total reflection conditions, and the mirror coating is applied to entire or a part of the first surface S11 or the third surface S13, and actually all of the image light is reflected. In addition, if the image light with a sufficient brightness can be obtained, the entire or a part of the first surface S11 or the third surface S13 may be coated with a somewhat transmissive mirror.

In the above description, the prism 10 is laterally extended in line with the eyes EY. However, the prism 10 can be disposed so as to be vertically extended. In this case, the device may have a structure in which the optical member 110 is disposed in parallel, not in series.

The entire disclosure of Japanese Patent Application No. 2013-025272, filed Feb. 13, 2013 is expressly incorporated by reference herein.

What is claimed is:

1. A virtual image display device for recognizing an image light and an external light at the same time, the device comprising:
    an image element that generates an image light; and
    a prism that includes three or more non-axisymmetric curved surfaces, and in which an intermediate image is formed as a part of an optical system,
    wherein, when the external light passes through a first surface and a third surface among a plurality of surfaces that configure the prism to recognize the outside, the visibility is substantially zero,
    wherein the first surface and the third surface form a concave surface with respect to an observer side,
    wherein the image light from the image element is totally reflected at the first surface, totally reflected at the third surface, totally reflected again at the first surface and reflected at the second surface, and then transmits through the first surface, and arrives at the observer side,
    wherein a half mirror is formed on the second surface and the image light is presented to the observer, and
    wherein a light transmitting member is integrally disposed outside the second surface and the visibility with respect to the external light is substantially zero, and the external light and the image light are presented to the observer overlapping.

2. The virtual image display device according to claim 1, wherein, with an origin of each surface which configures the optical system to be a reference, when an expression of a surface shape is polynomially expanded with respect to an orthogonal coordinates x and y which are extended in a tangential direction from the origin, the conditions in the below-described expressions (1) to (3) are satisfied, with coefficients of the terms $x^m \cdot y^n$ of the polynomial which indicates the $k_{th}$ surface as $Ak_{m,n}$ $$-5 \times 10^{-2} < A1_{2,0} + A1_{0,2} < -1 \times 10^{-3} \text{ and}$$

$$-5 \times 10^{-2} < A3_{2,0} + A3_{0,2} < -1 \times 10^{-3} \quad (1)$$

$$|A3_{2,0} - A3_{0,2}| < 5 \times 10^{-2} \quad (2)$$

$$|A1_{2,0} - A3_{2,0}| < 2 \times 10^{-2} \text{ and}$$

$$|A1_{0,2} - A3_{0,2}| < 2 \times 10^{-2} \quad (3).$$

3. The virtual image display device according to claim 1,
wherein the light transmitting member includes a first transmitting surface and a second transmitting surface in the observer side, and a third transmitting surface in the external side,
wherein the second surface of the prism and the second transmitting surface of the light transmitting member have substantially the same curved surface shapes, and
wherein the second surface and the second transmitting surface are integrated.

4. The virtual image display device according to claim 1, further comprising:
a projection lens that causes the image light from the image element to be incident on the prism,
wherein at least a part of the prism and the projection lens configure a relay optical system that forms an intermediate image.

5. The virtual image display device according to claim 4,
wherein the projection lens is formed of an axisymmetric lens and includes at least one or more aspherical surfaces.

6. The virtual image display device according to claim 4,
wherein the prism includes a fourth surface that guides the image light incident on the inside of the prism from the projection lens, to the first surface.

7. The virtual image display device according to claim 6,
wherein the prism includes a fifth surface that is disposed to face the projection lens, causes the image light emitted from the projection lens to be incident, and guides the image light to the fourth surface.

8. The virtual image display device according to claim 1,
wherein the prism includes a first prism portion of the light emitting side including the first surface, the second surface, and the third surface, and a second prism portion of the light incident side, and
wherein the first prism portion and the second prism portion are integrally formed.

9. The virtual image display device according to claim 8,
wherein the second prism portion includes at least one or more optical surfaces, and
wherein an intermediate image is formed by the image element, the projection lens, and at least a part of the prism where the second prism portion is included.

10. The virtual image display device according to claim 9,
wherein the image element is an image display element that emits an image light from the display position, and
wherein the projection lens and at least a part of the prism where the second prism portion is included cause the image light emitted from the display position of the image display element to form an image in the prism to form the intermediate image, as the relay optical system.

11. The virtual image display device according to claim 10,
wherein the second prism portion is disposed on the light incident side of the third surface of the first prism portion, and has a fourth surface that guides the image light incident on the inside from the projection lens to the first surface,
wherein, in the first surface, the first prism portion includes a first region where the image light passed through the fourth surface of the second prism portion is totally reflected a first time, and a second region where the image light is totally reflected a second time, and
wherein the intermediate image is formed by the projection lens and a part where the first region of the second prism portion and the first prism portion is included.

12. The virtual image display device according to claim 11,
wherein the first prism portion and the second prism portion cause the intermediate image to be formed in front or back of the first region of the first surface, or between the front and back of the first region.

13. The virtual image display device according to claim 11,
wherein the second prism portion includes a fifth surface that is disposed to face the projection lens and causes the image light emitted from the projection lens to be incident on and guides to the fourth surface, and a sixth surface that is formed by being interposed between the fourth surface and the fifth surface.

14. The virtual image display device according to claim 1,
wherein the gap between the first surface and the third surface is equal to or more than 5 mm and is equal to or less than 15 mm.

15. The virtual image display device according to claim 1,
wherein an inclination angle of the second surface with respect to the first surface is equal to or more than 20° and is equal to or less than 40°.

16. The virtual image display device according to claim 1,
wherein, when the device is mounted on, the optical system that includes the prism covers a part of the front of the observer's eyes, and a part where the front of the eyes is not covered exists.

17. The virtual image display device according to claim 1,
wherein the image element includes a signal light forming section that emits a signal light which is modulated based on the image, and a scanning optical system that emits the signal light as a scanning light by scanning the signal light incident on from the signal light forming section.

* * * * *